United States Patent
Aycock et al.

(10) Patent No.: US 10,395,113 B2
(45) Date of Patent: *Aug. 27, 2019

(54) POLARIZATION-BASED DETECTION AND MAPPING METHOD AND SYSTEM

(71) Applicant: Polaris Sensor Technologies, Inc., Huntsville, AL (US)

(72) Inventors: Todd M. Aycock, Huntsville, AL (US); David B. Chenault, Huntsville, AL (US); John S. Harchanko, Huntsville, AL (US)

(73) Assignee: Polaris Sensor Technologies, Inc., Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/450,948

(22) Filed: Mar. 6, 2017

(65) Prior Publication Data

US 2018/0005012 A1 Jan. 4, 2018

Related U.S. Application Data

(63) Continuation-in-part of application No. 14/602,823, filed on Jan. 22, 2015.

(Continued)

(51) Int. Cl.
*G06K 9/00* (2006.01)
*G06K 9/62* (2006.01)
(Continued)

(52) U.S. Cl.
CPC ............. *G06K 9/0063* (2013.01); *G01J 4/04* (2013.01); *G01V 8/10* (2013.01); *G02B 5/201* (2013.01);
(Continued)

(58) Field of Classification Search
CPC .......... G06K 9/00288; G06K 9/00275; G06K 9/209; G06K 9/4661; G06K 9/00255; G02B 27/00
See application file for complete search history.

(56) References Cited

U.S. PATENT DOCUMENTS 7,034,938 B1 * 4/2006 Miles .................... G01J 3/2823
356/327
8,217,368 B2 * 7/2012 Meyers .................. G01N 21/21
250/459.1

(Continued)

OTHER PUBLICATIONS

Horvath et al., "Ground-Based Full-Sky Imaging Polarimetry of Rapidly Changing Skies and its Use for Polarmetric Cloud Detections", 2002.*

*Primary Examiner* — Aaron W Carter

(74) *Attorney, Agent, or Firm* — Angela Holt; Bradley Arant Boult Cummings LLP

(57) ABSTRACT

A method for detecting and tracking aerial objects and vehicles comprises recording raw image data using a polarimeter to obtain polarized images of the sky. The images are then corrected for non-uniformity, optical distortion, and registration. IR and polarization data products are computed, and the resultant data products are converted to a multi-dimensional data set for exploitation. Contrast enhancement algorithms are applied to the multi-dimensional imagery to form enhanced object images. The enhanced object images may then be displayed to a user, and/or an annunciator may announce the presence of an object.

20 Claims, 21 Drawing Sheets
(11 of 21 Drawing Sheet(s) Filed in Color)

Related U.S. Application Data

(60) Provisional application No. 62/041,778, filed on Aug. 26, 2014, provisional application No. 61/930,272, filed on Jan. 22, 2014.

(51) Int. Cl.

| | | |
|---|---|---|
| *G06K 9/20* | (2006.01) | |
| *H04N 9/64* | (2006.01) | |
| *G06K 9/46* | (2006.01) | |
| *G01V 8/10* | (2006.01) | |
| *G01J 4/04* | (2006.01) | |
| *G02B 5/20* | (2006.01) | |
| *G02B 27/28* | (2006.01) | |

(52) U.S. Cl.
CPC ....... *G02B 27/288* (2013.01); *G06K 9/00255* (2013.01); *G06K 9/209* (2013.01); *G06K 9/4661* (2013.01); *G06K 9/6267* (2013.01); *H04N 9/646* (2013.01)

(56) References Cited

U.S. PATENT DOCUMENTS

| | | | | |
|---|---|---|---|---|
| 9,589,195 | B2* | 3/2017 | Aycock | G06K 9/00255 |
| 9,631,973 | B2* | 4/2017 | Dorschner | G01J 1/0429 |
| 9,741,163 | B2* | 8/2017 | Fest | G06T 17/00 |
| 9,830,506 | B2* | 11/2017 | Short | G06K 9/00288 |
| 9,970,861 | B2* | 5/2018 | Chenault | G01N 21/21 |
| 9,989,625 | B2* | 6/2018 | Aycock | G01S 3/7861 |
| 2005/0264813 | A1* | 12/2005 | Giakos | B82Y 20/00 |
| | | | | 356/369 |
| 2006/0164643 | A1* | 7/2006 | Giakos | G01J 3/02 |
| | | | | 356/369 |
| 2008/0088842 | A1* | 4/2008 | Schultz | G01J 4/04 |
| | | | | 356/367 |
| 2008/0165359 | A1* | 7/2008 | Mattox | G01J 4/04 |
| | | | | 356/367 |
| 2010/0073753 | A1* | 3/2010 | Kimura | G02F 1/1396 |
| | | | | 359/246 |
| 2011/0169943 | A1* | 7/2011 | Bachman, II | G06K 9/209 |
| | | | | 348/117 |
| 2012/0075473 | A1* | 3/2012 | Sarwar | G01J 4/00 |
| | | | | 348/156 |
| 2012/0075513 | A1* | 3/2012 | Chipman | G01J 4/04 |
| | | | | 348/302 |
| 2013/0027555 | A1* | 1/2013 | Meadow | 348/144 |
| 2013/0135453 | A1* | 5/2013 | Kanamori | A61B 1/00009 |
| | | | | 348/65 |
| 2013/0258173 | A1* | 10/2013 | Nakamura | H04N 5/2254 |
| | | | | 348/360 |
| 2013/0293871 | A1* | 11/2013 | Gruev | G01J 3/2803 |
| | | | | 356/73 |
| 2014/0078298 | A1* | 3/2014 | Kudenov | G01J 3/2803 |
| | | | | 348/135 |
| 2014/0247361 | A1* | 9/2014 | Sarwar | G01J 4/00 |
| | | | | 348/156 |
| 2015/0168210 | A1* | 6/2015 | Dorschner | G01J 1/0429 |
| | | | | 349/18 |
| 2015/0219498 | A1* | 8/2015 | Tillotson | G01J 4/04 |
| | | | | 348/144 |
| 2015/0226827 | A1* | 8/2015 | Aycock | G01S 3/7861 |
| | | | | 382/103 |
| 2016/0061665 | A1* | 3/2016 | Chenault | G01N 21/21 |
| | | | | 356/51 |
| 2016/0232709 | A1* | 8/2016 | Videen | H04N 5/33 |
| 2016/0253551 | A1* | 9/2016 | Pezzaniti | G06K 9/00275 |
| | | | | 382/118 |
| 2016/0307053 | A1* | 10/2016 | Aycock | G06K 9/00255 |
| 2017/0132458 | A1* | 5/2017 | Short | G06K 9/00288 |
| 2017/0178399 | A1* | 6/2017 | Fest | G06T 17/00 |
| 2017/0184700 | A1* | 6/2017 | Aycock | G01S 5/163 |
| 2017/0299501 | A1* | 10/2017 | Chenault | G01N 21/21 |
| 2018/0005012 | A1* | 1/2018 | Aycock | G06K 9/0063 |
| 2018/0100731 | A1* | 4/2018 | Pau | G01B 11/14 |

* cited by examiner

Fig. 9a
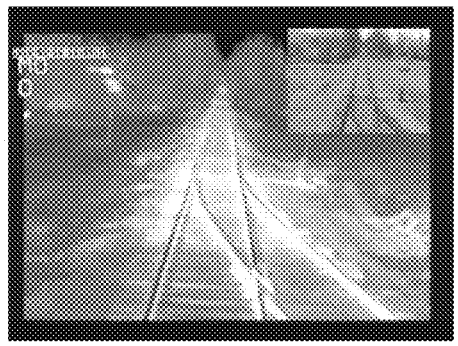
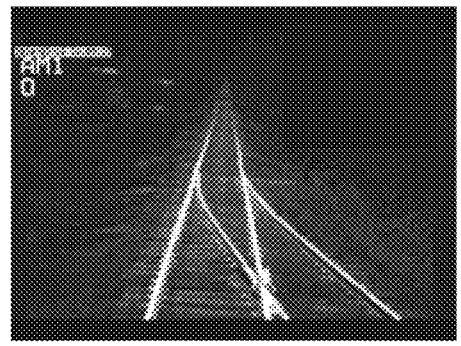
Fig. 9b  Fig. 9c
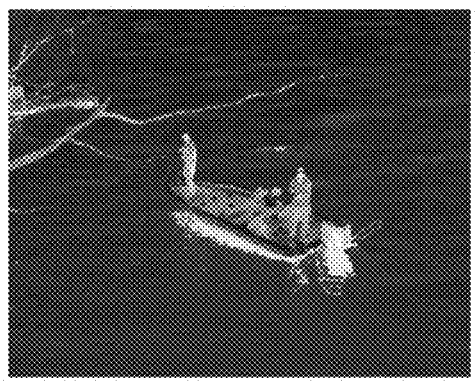
Fig. 10a  Fig. 10b
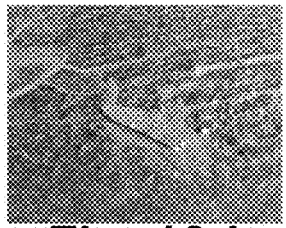
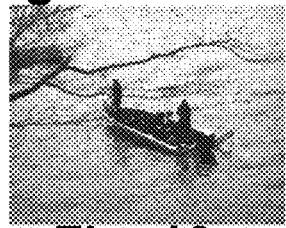
Fig. 10c  Fig. 10d  Fig. 10e

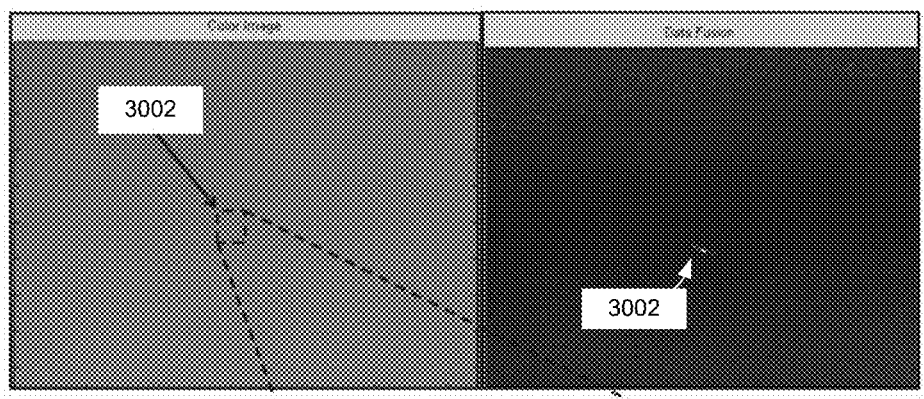
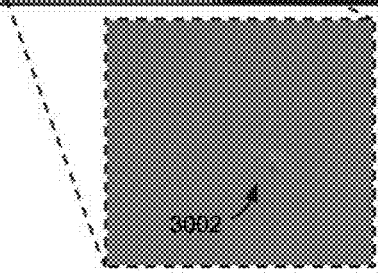
Fig. 32
Fig. 33
Fig. 34

POLARIZATION-BASED DETECTION AND MAPPING METHOD AND SYSTEM

REFERENCE TO RELATED APPLICATIONS

This application is a continuation-in-part of U.S. Non-Provisional Application Ser. No. 14/836,549 (issued as U.S. Pat. No. 9,589,195) titled "Polarization-Based Mapping and Perception Method and System," filed on Aug. 26, 2015, which claims the benefit of and priority to Provisional Patent Application U.S. Ser. No. 62/041,778, entitled "Polarization-based Mapping and Perception System and Method," filed on Aug. 26, 2014, each of which is fully incorporated herein by reference. This application further is a continuation-in-part of U.S. Non-Provisional Application Ser. No. 14/602,823, entitled "Polarization Imaging for Facial Recognition Enhancement System and Method," and filed on Jan. 22, 2015, which claims the benefit of U.S. Provisional Application No. 61/930,272, entitled "Polarization Imaging for Facial Recognition Enhancement," and filed on Jan. 22, 2014, both of which are fully incorporated herein by reference.

GOVERNMENT LICENSE RIGHTS

This invention was made with government support under Contract Number N00014-13-C-0290 awarded by the U.S. Navy. The government has certain rights in the invention.

BACKGROUND AND SUMMARY

A method using polarimetry for detecting aerial objects is disclosed herein. The described method is not tied to any one specific polarimeter sensor architecture, and thus the method described pertains to all polarimetric sensors capable of detecting the critical polarimetric signature. The method comprises recording raw image data of an area using a polarimeter to obtain polarized images of the area. The images are then corrected for non-uniformity, optical distortion, and registration in accordance with the procedure necessitated by the sensor's architecture. IR and polarization data products are computed, and the resultant data products are converted to a multi-dimensional data set for exploitation. Contrast enhancement algorithms are applied to the multi-dimensional imagery to form enhanced object images. The enhanced object images may then be displayed to a user, and/or an annunciator may announce the presence of an object.

DESCRIPTION OF THE DRAWINGS

The patent or application file contains at least one drawing executed in color. Copies of this patent or patent application publication with color drawings will be provided by the Office upon request and payment of the necessary fee.

FIG. 5b is a thermal image of the roadway of FIG. 5a.

FIG. 7b is a thermal image of the road of FIG. 7a.

FIG. 7c is a contrast enhanced thermal image of the road of FIG. 7a.

FIG. 7d is a polarization image of the road of FIG. 7a.

FIG. 8b is a thermal image of the road FIG. 8a.

FIG. 8c is a contrast enhanced thermal image of the road of FIG. 8a.

FIG. 8d is a polarization image of the road of FIG. 8a.

FIG. 9a depicts a visible image of train tracks.

FIG. 9b is a thermal image of the train tracks of FIG. 9a.

FIG. 9c is a polarization image of the train tracks of FIG. 9a.

FIG. 10a is a Stokes vector image $S_0$ of a maritime scene showing fishermen in a boat.

FIG. 10b is a ColorFuse image of the scene of FIG. 10a.

FIG. 10c is a Stokes vector images $S_1$ of the maritime of FIG. 10a.

FIG. 10d is a Stokes vector images $S_2$ of the maritime of FIG. 10a.

FIG. 10e is a DoLP image of the maritime scene of FIG. 10a.

FIG. 32 depicts the imagery from the color camera in the test of the system of FIG. 30.

FIG. 33 is a zoomed-in view of the image of FIG. 32.

FIG. 34 is a data fusion image of the three images in FIG. 31a-31c.

DETAILED DESCRIPTION

Figure 1:
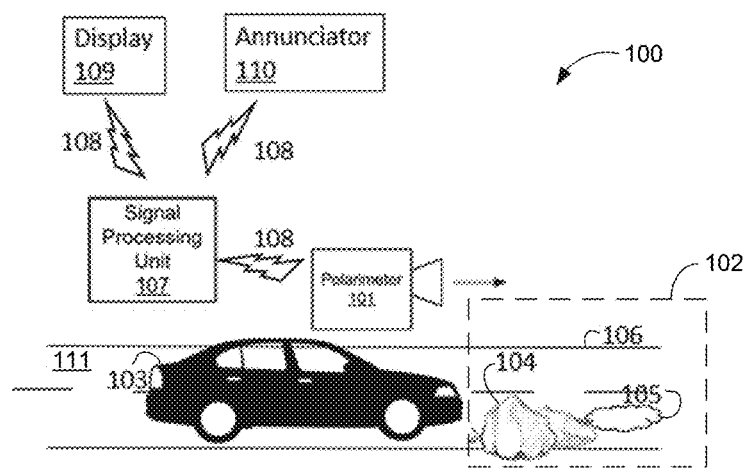
FIG. 1 is a block diagram illustrating a system in accordance with an exemplary embodiment of the present disclosure.

FIG. 1 illustrates a system 100 in accordance with an exemplary embodiment of the present disclosure. The system 100 comprises a polarimeter 101 mounted on a vehicle 103 and a signal processing unit 107, which collect and analyze images of a surface 111 for detection and annunciation of an object 102. Exemplary objects 102 shown in FIG. 1 include an obstacle 104, water or mud puddle 105, and a roadway edge 106. As used in this disclosure, the term "object" may refer to any object, pathway defect or area of interest, including in some embodiments humans or other animals. In FIG. 1, the obstacle 104 and the puddle 105 are objects the vehicle would want to avoid. The roadway edge 106 is an object that the vehicle would want to know the location of, in order to stay on a roadway. Thus in some embodiments, the objects 102 are objects to be avoided or located in order to safely navigate the vehicle 103. In other embodiments, the objects 102 are items in need of location, for example, humans during search and rescue operations, as further discussed herein.

The polarimeter 101 comprises a polarizing imaging device for recording polarized images, such as a digital camera or thermal imager that collects images. The vehicle 103 may be an automobile, watercraft, aircraft, or any navigable vehicle, or a human on foot. The polarimeter 101 collects raw image data of the roadway environment consisting of the surface 111 (a roadway, for example), and objects 102 such as the obstacle 104, the water or mud puddle 105, and the roadway edge 106.

The polarimeter 101 transmits raw image data to the signal processing unit 107, which processes the data as further discussed herein. The processed data is then displayed to the operator on display 109 or detection is annunciated on an annunciator 110, as further discussed herein. Although FIG. 1 shows the polarimeter 101, the signal processing unit 107, the display 109, and annunciator 110 as separate items, the polarimeter 101 and signal processing unit 107 are packaged into one device in certain embodiments and placed on the vehicle 103 such that the polarimeter has a view of the roadway, and with the display 109 and annunciator 110 packaged together and placed inside the vehicle.

In the illustrated embodiment, the polarimeter 101 sends raw image data (not shown) to the signal processing unit 107 over a network or communication channel 108 and processed data sent to the display 109 and annunciator 110. The signal processing unit 107 may be any suitable computer known in the art or future-developed. The signal processing unit 107 receives the raw image data, filters the data, and analyzes the data as discussed further herein to provide enhanced imagery and detections and annunciations. The network 108 may be of any type network or networks known in the art or future-developed, such as a simple communications cable, the internet backbone, Ethernet, Wifi, WiMax, broadband over power line, coaxial cable, and the like. The network 108 may be any combination of hardware, software, or both. Further, the network 108 could be resident in a sensor (not shown) housing both the polarimeter 101 and the signal processing unit 107.

In another exemplary embodiment (not shown), the vehicle 103 comprises manned or unmanned (autonomous) agricultural equipment in a farming environment and the objects 102 include obstacles along farm roads or in fields. In another embodiment, the vehicle 103 comprises manned or unmanned (autonomous) vessels that operate on waterways or oceans and the objects 102 are floating in the water. In another exemplary embodiment (not shown), the vehicle 103 comprises a person or vessel conducting search and rescue activities and objects 102 are victims of an incident involving bodies of water. In another exemplary embodiment (not shown), the vehicle 103 comprises manned or unmanned (autonomous) aircraft and objects 102 are those found in an airfield environment, including runways and the grassy areas in and around runways. In another exemplary embodiment (not shown), the vehicle 103 comprises railroad equipment and the objects 102 are those found in the environment around railroad tracks and switches.

Figure 2:
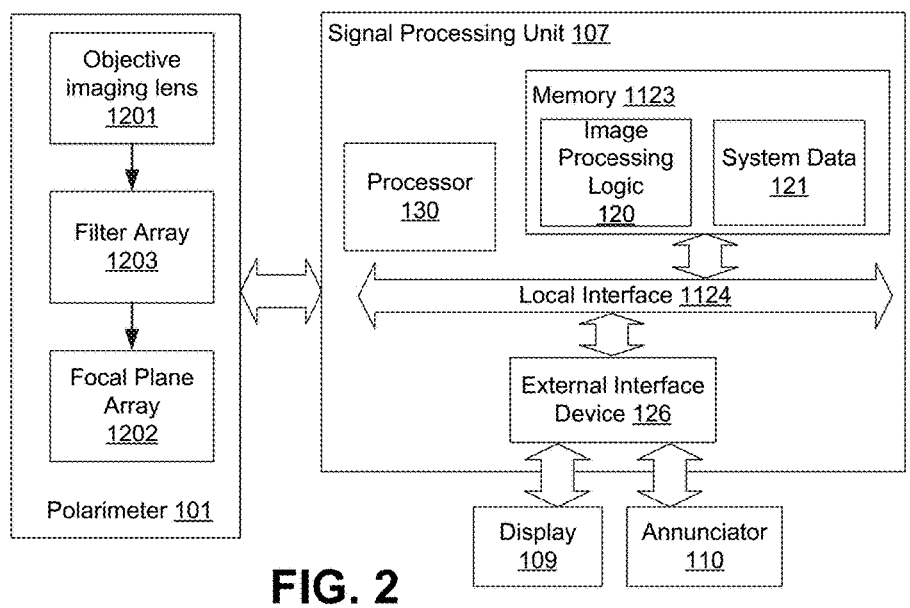
FIG. 2 depicts an exemplary polarimeter and signal processing unit as depicted in FIG. 1.

FIG. 2 depicts an exemplary polarimeter 101 and signal processing unit 107 according to an embodiment of the present disclosure. The polarimeter 101 comprises an objective imaging lens 1201, a filter array 1203, and a focal plane array 1202. The objective imaging lens 1201 comprises a lens pointed at the surface 111 (FIG. 1). The filter array 1203 filters the images received from the objective imaging lens system 1201. The focal plane array 1202 comprises an array of light sensing pixels.

The signal processing unit 107 comprises image processing logic 120 and system data 121. In the exemplary signal processing unit 107 image processing logic 120 and system data 121 are shown as stored in memory 1123. The image processing logic 120 and system data 121 may be implemented in hardware, software, or a combination of hardware and software.

The signal processing unit 107 also comprises a processor 130, which comprises a digital processor or other type of circuitry configured to run the image processing logic 120 by processing the image processing logic 120, as applicable. The processor 130 communicates to and drives the other elements within the signal processing unit 107 via a local interface 1124, which can include one or more buses. When stored in memory 1123, the image processing logic 120 and the system data 121 can be stored and transported on any computer-readable medium for use by or in connection with logic circuitry, a processor, an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Exemplary system data 121 is depicted comprises:
 a. Raw image data (not pictured) from the polarimeter 101 (FIG. 2) obtained from step 1001 of the method 100 (FIG. 3).
 b. Corrected image data (not pictured), which is the data that has been corrected for non-uniformity, optical distortion, and registration per step 1002 of the method 1000 (FIG. 3).
 c. Thermal (IR) and Polarization images obtained from step 1003 of the method 1000 (FIG. 3).
 d. Conversion of polarization and thermal data to multi-dimensional image data applied in step 1004 of the method 1000 (FIG. 3).
 e. Contrast enhancing algorithms applied to image data in step 1005 of the method 1000 (FIG. 3).
 f. Object detection algorithms applied to contrast enhanced image data in step 1006 of the method 1000 (FIG. 3).
 g. Image data applied to the display 109 and annunciator 110 in step 1007 of the method 1000 (FIG. 3).
 h. Thermal image data as described herein.
 i. Hybrid thermal/polarization images as described herein.

Figure 3:
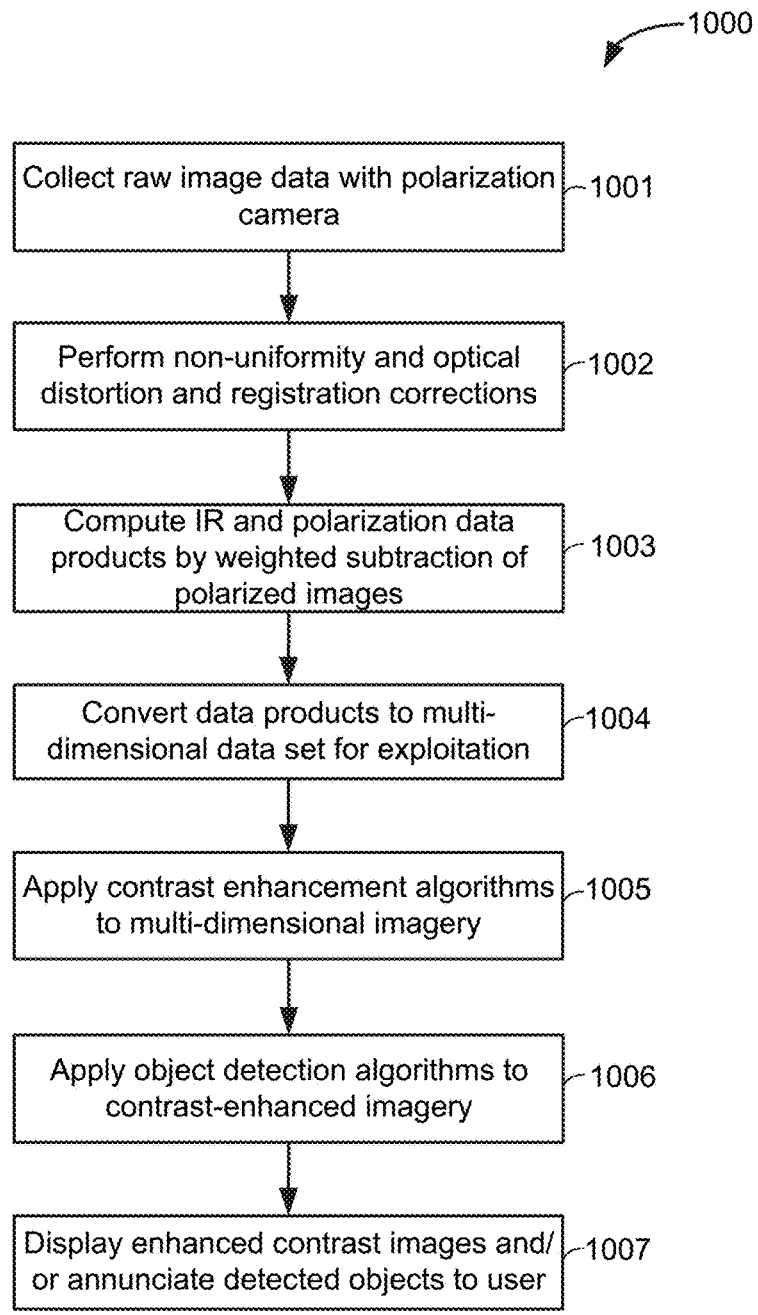
FIG. 3 is a flowchart depicting exemplary architecture and functionality of the system logic in accordance with an exemplary embodiment of the disclosure.

The image processing logic 120 executes the processes described herein with respect to FIG. 3.

Referring to FIG. 2, an external interface device 126 connects to and communicates with the display 109 and annunciator 110. The external interface device 126 may also communicate with or comprise an input device, for example, a keyboard, a switch, a mouse, a touchscreen, and/or other type of interface, which can be used to input data from a user of the system 100. The external interface device 126 may also or alternatively communicate with or comprise a personal digital assistant (PDA), computer tablet device, laptop, portable or non-portable computer, cellular or mobile phone, or the like. The external interface device 126 may also or alternatively communicate with or comprise a non-personal computer, e.g., a server, embedded computer, field programmable gate array (FPGA), microprocessor, or the like.

The external interface device 126 is shown as part of the signal processing unit 107 in the exemplary embodiment of FIG. 2. In other embodiments, the external interface device 126 may be outside of the signal processing unit 107.

The display device 109 may consist of a tv, lcd screen, monitor or any electronic device that conveys image data resulting from the method 1000 or is attached to a personal digital assistant (PDA), computer tablet device, laptop, portable or non-portable computer, cellular or mobile phone, or the like. The annunciator device 110 can consist of a warning buzzer, bell, flashing light, or any other auditory or visual or tactile means to warn the operator of the detection of an object or obstacle.

In some embodiments, autonomous action may be taken based upon the objects 102 (FIG. 1) detected. For example, the vehicle 103 (FIG. 1) may automatically be directed to avoid objects 102. In this regard, the external interface device 126 may interface with the vehicle 103 such that the processor 130 may direct the vehicle to swerve around an object 102. In some cases where automatic action is taken, the annunciator 110 may not be required.

In other embodiments, a Global Positioning System ("GPS") device (not shown) may interface with the external interface device 126 to provide a position of the objects 102 detected.

In the illustrated embodiment, the display 109 and annunciator 110 are shown as separate, but the annunciator 110 may be combined with the display 109, and in another embodiments, annunciation could take the form of highlighted boxes or regions or another means used to highlight the object as part of the image data display. For example, an indicator box (e.g., a red box (not shown)), can provides a visual indication of an object 102 detected.

FIG. 3 is a flowchart depicting exemplary architecture and functionality of the image processing logic 120 (FIG. 2) in accordance with a method 1000. In step 1001 of the method 1000, the polarimeter 101 captures an image of a roadway scene from a vehicle on a roadway 111 (FIG. 1) and sends raw image data to the signal processing unit 107 (FIG. 1).

In step 1002, the signal processing unit 107 (FIG. 1) corrects imager non-uniformity of the images received from the polarimeter 101. Examples of imager non-uniformity include fixed pattern lines in the image, noisy pixels, bad pixels, bright spots, and the like. Algorithms that are known in the art may be used for correcting the imager non-uniformity. In some embodiments, step 1002 is not performed because the imager non-uniformity does not require correction.

Additionally in step 1002, the signal processing unit 107 removes image distortion from the image data. An example of image distortion is warping at the edges of the image caused by the objective imaging lens system. Algorithms that are known in the art may be used for correcting image distortion. Registration corrections may also be performed in step 1002, using methods known in the art.

In step 1003, non-polarized intensity and polarization data products are computed. The non-polarized intensity is generally taken to be the intensity as would be measured by a conventional imager. Intensity is used as the general term for and could be replaced with radiance, irradiance, or radiant intensity. In this step, Stokes parameters ($S_0$, $S_1$, $S_2$) are calculated by weighted subtraction of the polarized image obtained in step 1002. The LWIR imaging polarimeter measures both a radiance image and a polarization image. A radiance image is a standard image whereby each pixel in the image is a measure of the radiance, typically expressed in Watts/cm2-sr, reflected or emitted from that corresponding pixel area of the scene. Standard photographs and thermal images are radiance images, simply mappings of the radiance distribution emitted or reflected from the scene. A polarization image is a mapping of the polarization state distribution across the image. The polarization state distribution is typically expressed in terms of a Stokes image.

Of the Stokes parameters, $S_0$ represents the conventional LWIR thermal image with no polarization information. $S_1$ and $S_2$ display orthogonal polarimetric information. Thus the Stokes vector, first introduced by G.G. Stokes in 1852, is useful for describing partially polarized light and is defined as $$\vec{S} = \begin{bmatrix} s_o \\ s_1 \\ s_2 \\ s_3 \end{bmatrix} = \begin{bmatrix} I_0 + I_{90} \\ I_0 - I_{90} \\ I_{45} - I_{135} \\ I_R - I_L \end{bmatrix} \quad (1)$$

Where $I_0$ is the radiance that is linearly polarized in a direction making an angle of 0 degrees with the horizontal plane, $I_{90}$ is radiance linearly polarized in a direction making an angle of 90 degrees with the horizontal plane. Similarly $I_{45}$ and $I_{135}$ are radiance values of linearly polarized light making an angle of 45° and 135° with respect to the horizontal plane. Finally $I_R$ and $I_L$ are radiance values for right and left circularly polarized light. For this invention, right and left circularly polarized light is not necessary and the imaging polarimeter does not need to measure these states of polarization. For this reason, the Stokes vectors considered will be limited to the first 3 elements which express linearly polarized light only, $$\vec{S} = \begin{bmatrix} s_o \\ s_1 \\ s_2 \end{bmatrix} = \begin{bmatrix} I_0 + I_{90} \\ I_0 - I_{90} \\ I_{45} - I_{135} \end{bmatrix} \quad (2)$$

Another useful form of equation (2) is a normalized form of the equation given by $$\vec{s} = s_o \begin{bmatrix} 1 \\ s_1/s_o \\ s_2/s_o \end{bmatrix} = (I_0 + I_{90}) \begin{bmatrix} 1 \\ (I_0 - I_{90})/(I_0 + I_{90}) \\ (I_{45} - I_{135})/(I_0 + I_{90}) \end{bmatrix} \quad (3)$$

The polarization state emitted or reflected from the roadway surface, surfaces to the side of the road, and objects or surfaces in the road depends on a number of factors including the angle of emission, the surface temperature of the surface, the micro-roughness of the surface (texture), the complex refractive index of the surface and the background temperature of the surrounding environment. The invention here primarily makes use of the fact that the polarization state of light emitted and reflected from the surfaces and objects is a function of angle of emission and different surface texture.

The emissivity of an object is determined from Kirchoff's radiation law. The most familiar form of Kirchoff's law is gives the emissivity of a surface ε in terms of the reflectance r, given by $$\varepsilon(\theta, \phi) = 1 - r(\theta) \quad (4)$$

where θ is the angle between the surface normal and the camera's line of sight. The more general equations for Kirchoff's law are given by $$\varepsilon_p(\theta) = 1 - r_p(\theta) \quad (5)$$

and $$\varepsilon_s(\theta) = 1 - r_s(\theta) \quad (6)$$

where the subscripts p and s denote the emissivity and reflectance of particular polarization states. The p-state indicates the plane of emission for light that is linearly polarized in a plane that contains the surface normal and the line of sight to the camera. For example, if the camera is looking down at a horizontal surface, the p-state of polarization would appear vertically polarized. The s-state of polarization is perpendicular to the p-state. Note that the temperature and wavelength dependence are suppressed in equations 4-6.

Substituting equations (5) and (6) into equation (3) gives $$\vec{s} = s_0 \begin{bmatrix} 1 \\ P(\theta)\cos(\phi) \\ P(\theta)\sin(\phi) \end{bmatrix} \quad (7)$$

where φ is the angle that the plane of incidence makes with the horizontal plane and $$P(\theta) = \left( \frac{\varepsilon_s(\theta) - \varepsilon_p(\theta)}{\varepsilon_s(\theta) + \varepsilon_p(\theta)} \right) \quad (8)$$

Equation 8 can be written out more explicitly as $$P(\theta) = \left( \frac{1 - r_s(\theta) - (1 - r_p(\theta))}{1 + r_s(\theta) + 1 + r_p(\theta)} \right) = \left( \frac{r_p(\theta) - r_s(\theta)}{2 + r_p(\theta) + r_s(\theta)} \right) \quad (9)$$

where $r_p$ and $r_s$ are given by the Fresnel equations for reflection $$r_p = \sqrt{\frac{n^2\cos(\theta) - \sqrt{n^2 - \sin^2(\theta)}}{n^2\cos(\theta) + \sqrt{n^2 - \sin^2(\theta)}}} \quad (9a)$$

$$r_s = \sqrt{\frac{\cos(\theta) - \sqrt{n^2 - \sin^2(\theta)}}{\cos(\theta) + \sqrt{n^2 - \sin^2(\theta)}}} \quad (9b)$$

Note that P(θ) does not explicitly depend on the angle φ that the plane of incidence makes with the horizontal plane. The angle φ is critical to determine the orientation of plane of incidence and ultimately the azimuthal angle of the surface normal. The angle φ can be determined from the following angle, $$\phi = \arctan\left(\frac{s_2}{s_1}\right) \quad (10)$$

The angle θ can be determined a number of ways. A method for determining θ and φ from a normalized Stokes image (Equation 3) are known in the art.

Also in step 1003, a degree of linear polarization (DoLP) image is computed from the Stokes images. A DoLP image is useful for providing contrast for roadway surface and objects in the road, and can be calculated as follows:

$$DoLP = \sqrt{(s_1/s_o)^2 + (s_2/s_o)^2} \quad (11)$$

or

-continued $$DoLP = \left(\frac{\varepsilon_s(\theta) - \varepsilon_p(\theta)}{\varepsilon_s(\theta) + \varepsilon_p(\theta)}\right) = \left(\frac{r_p(\theta) - r_s(\theta)}{2 + r_p(\theta) + r_s(\theta)}\right) \quad (12)$$

Note that DoLP is linear polarization. As one with skill in the art would know, in some situations polarization that is not linear (e.g., circular) may be desired. Thus in other embodiments, step 1004 may use polarization images derived from any combination of $S_0$, $S_1$, $S_2$, or $S_3$ and is not limited to DoLP.

The DoLP image is one available image used to view polarization contrast in an image. Another alternative image to view polarization content is a "ColorFuse" image that is generated by mapping the radiance, DoLP, and orientation images to a color map. Persons with skill in the art makes the following mapping of polarization data to a hue-saturation-value representation for color:

$S_0$=value
DoLP=saturation
Orientation φ=hue

This representation enables display of all optical information (radiance and polarization) in a single image and provides a means to show both radiometric and polarization contrast enhancing understanding of the scene. In many cases where polarization contrast is strong, this representation provides scene context for the surfaces or objects that are polarized. Those experienced in the art can imagine other ways of doing this.

The ColorFuse is one embodiment of multidimensional representation that can be produced in step 1004. Those knowledgeable in the art can conceive similar mappings. For one example, the DoLP information may be emphasized when radiance values are low.

As mentioned above, the polarization state emitted or reflected from the surface of objects or surfaces in the imaged scene depends on a number of factors including the angle of emission, the surface temperature of the surface, the micro-roughness or texture of the surface, and the complex refractive index of the surface. Generally speaking then, the contrast of surfaces and objects in the scene due to polarization are dependent on the geometry and the material or surface properties of the objects in the scene. While surface temperature contributes to polarization signature contrast, temperature differences of objects in the scene are not necessary in order for there to be polarization contrast. This is important because frequently many objects in an imaged scene can be at the same or very similar temperatures and hence show little contrast.

Because the underlying optical radiation depends on emission, no additional light sources, illumination, or ambient light is required for polarization imaging. This is a key point and differentiates this approach from all of the prior art. Further, the approach works equally well during the night time as it does during the day.

In step 1005, contrast enhancing algorithms that are known in the art are applied to the multidimensional image from step 1004. The multi-dimensional data exploits the polarization data to significantly enhance the information content in a scene. Non-restrictive examples include global mean, variance, and higher order moment analysis, Principal Component Analysis, or Linear Discriminate Analysis, computation of the statistics of the multidimensional data as a whole and then computation of local values based on a kernel convolved with the image as a whole and then normalized by global statistics of the scene.

In step 1006, object detection algorithms that are known in the art are applied to the contrast enhanced data from step 1005. Non-restrictive examples of object detection algorithms include setting manually or automatically a threshold value based on the image statistics, segmenting portions of the image based on the contrast enhancements, edge detection, and morphological properties.

In step 1007, detected objects may then be annunciated to the user through visual or auditory means. Non-restrictive examples includes bells, buzzers or lights to draw the operator's attention to the display, or indications on the display such as distinctive colors or boxes in the region of the obstacle or surface. In addition or alternatively, in step 1007 enhanced contrast images may be displayed to the user (not shown).

In other embodiments, steps 1003, 1004, 1005, and 1006 are used in combinations that omit one or more of the steps. In other embodiments, the polarization image data, or the multi-dimensional (ColorFuse) data, may be viewed by humans for object detection, and no algorithms are applied.

Algorithms that exploit a combination of image features extracted from a LWIR imaging polarimeter can be used to detect potential obstacles or roadway edges. In the case of train tracks, algorithms could be used to confirm continuity of the tracks automatically. Once potential noteworthy features are detected, they can be automatically highlighted for the operator, and a warning can be given through some annunciation mechanism (buzzer or light). Algorithms could also potentially be used to exploit the orientation information to help improve understanding of the image such as segmentation or shape recognition.

For the purposes of operating a vehicle, the enhanced contrast enables the mapping of features in the imaged scene that, through operator perception or automated detection and warning, improves the safety of the operator, or in the case of autonomously operated equipment such as agricultural equipment, provides autonomous obstacle avoidance to the steering or navigation systems. Specifically, improved detection and recognition of obstacles will allow the operator to maneuver the vehicle (or vessel) to avoid obstacles. Improved detection and perception of roadway edges will reduce chances of inadvertently leaving the roadway. This is especially true at night when the operator's vision is limited by darkness.

As discussed herein, the system and method of the present disclosure adds a polarimetric signature to the information that was previously attainable by an IR camera, i.e., temporal, special and IR signature. These four categories of information can be used simultaneously to classify/categorize objects detected. Further, the classification/categorization of the detected objects can influence evasive action to be taken by a vehicle. For example, a detected object in a roadway may be classified as an obstacle that needs to be avoided, rather than a pothole the vehicle is capable of driving over. Further, multiple objects may be independently and simultaneously classified into separate groups or subgroups based on their temporal, spatial, IR, and/or polarimetric signatures in accordance with given criteria.

Figure 4A:
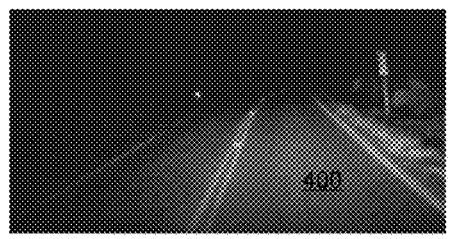
FIG. 4a depicts a visible image of a roadway at night.
Figure 4B:
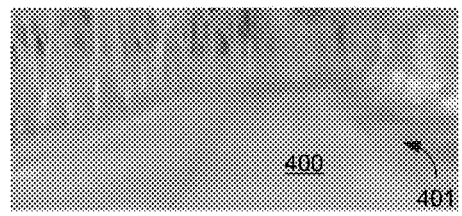
FIG. 4b is a thermal image of the same roadway at night.
Figure 4C:
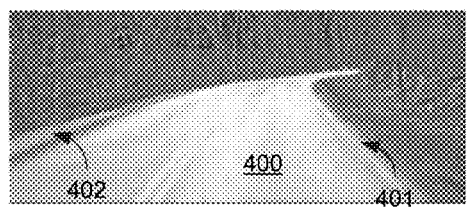
FIG. 4c depicts a polarization image of the roadway obtained with the system and method according to an exemplary embodiment of the present disclosure.

FIG. 4a depicts a visible image of a roadway 400 at night. FIG. 4b is a thermal image of the same roadway 400 at night. Note that in FIG. 4b, the roadway 400 and surrounding terrain have nearly the same temperature and hence there is little contrast between the roadway 400 and a shoulder 401 of the road in the thermal image. FIG. 4c depicts a polarization image of the roadway 400 obtained with the system and method according to an exemplary embodiment of the present disclosure. The polarization image in 4c shows strong contrast of the road 400 and the shoulder 401 is easily discernable. A white stripe 402 that parallels the roadway 400 on the left hand side is a sidewalk. The polarization image in 4c was obtained with no external light source.

Figure 5A:
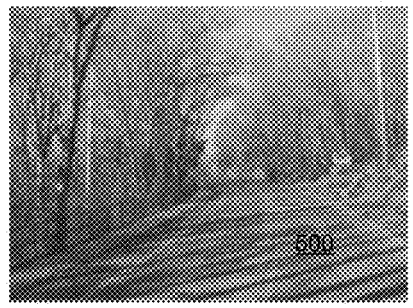
FIG. 5a is a visible image of a roadway during the daytime.
Figure 5B:
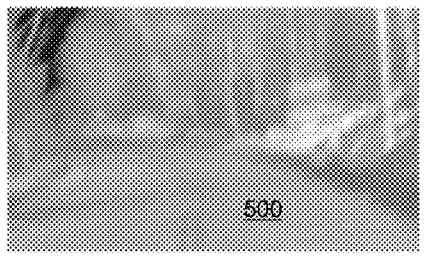
Figure 5C:
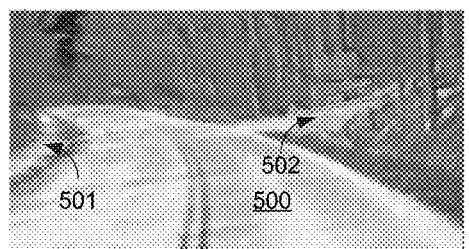
FIG. 5c is a polarization image of the roadway of FIG. 5a obtained with the system and method according to an exemplary embodiment of the present disclosure.

FIG. 5a is a visible image of a roadway 500 during the daytime. FIG. 5b is a thermal image of the roadway 500 of FIG. 5a. The roadway 500 and other scene elements show confusing contrast in the thermal image of FIG. 5b. FIG. 5c is a polarization image of the roadway 500 of FIG. 5a obtained with the system and method according to an exemplary embodiment of the present disclosure. The polarization image of FIG. 5c shows strong contrast of only the roadway 500. A sidewalk 501 that parallels the road on the left hand side and a driveway 502 on the right are easily discernable in the polarization image of FIG. 5c. The sidewalk 501 and the driveway 502 are not easily perceptible in the thermal image of FIG. 5b.

Figure 6A:
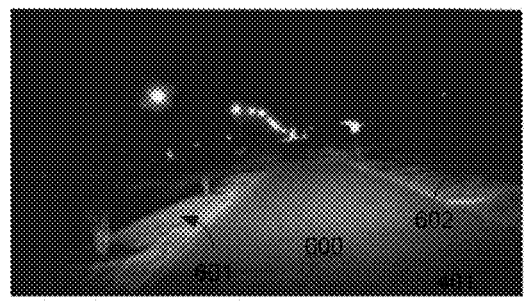
FIG. 6a is a visible image of a roadway that has a median and sidewalk, shown at night.
Figure 6B:
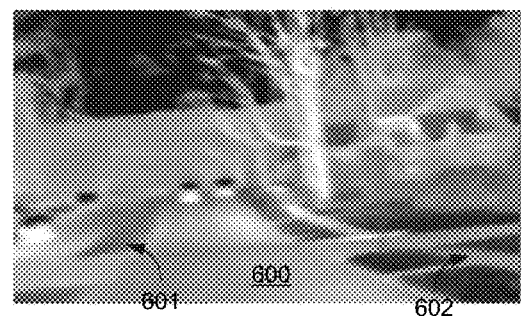
FIG. 6b is a thermal image of the roadway of FIG. 6a, also at night.

FIG. 6a is visible image of a roadway 600 that has a median 601 and sidewalk 602, shown at night. FIG. 6b is a thermal image of the roadway 600 of FIG. 6a, also at night. The roadway and surrounding terrain have similar temperatures and hence there is weak contrast between the roadway and the media of the road in the thermal image.

Figure 6C:
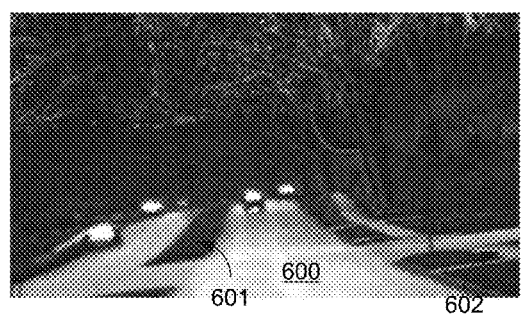
FIG. 6c is a polarization image of the roadway of FIG. 6a obtained with the system and method according to an exemplary embodiment of the present disclosure

FIG. 6c is a polarization image of the roadway 600 of FIG. 6a obtained with the system and method according to an exemplary embodiment of the present disclosure. The polarization image of FIG. 6c shows strong contrast of the roadway 600. The sidewalk 602 that parallels the road on the right hand side and the median 601 are easily discernable in the polarization image of FIG. 6c. The sidewalk 602 and the median 601 are not easily perceptible in the thermal image of FIG. 6b.

Figure 7A:
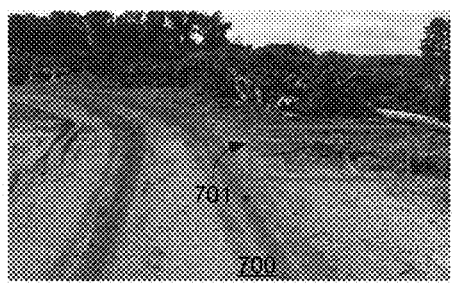
FIG. 7a is a visible image of a dirt road depicting exemplary obstacles on the road.
Figure 7B:
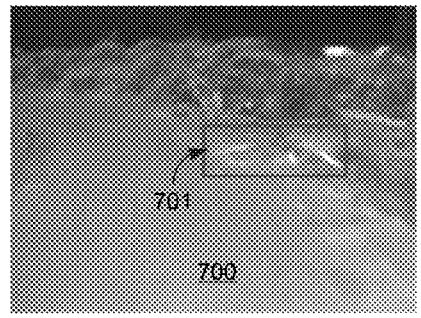
Figure 7C:
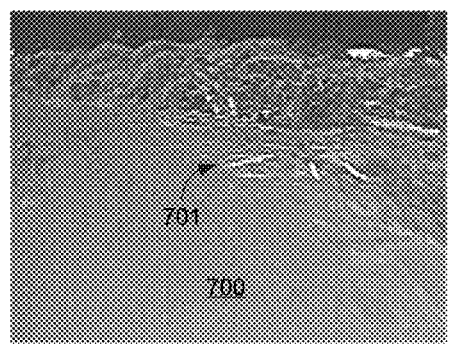

FIG. 7a is a visible image of a dirt road 700 depicting exemplary obstacles 701 on a road 700. The obstacles 701 comprise wood planks in the image. FIG. 7b is a thermal image of the road 700 of FIG. 7a. In the image of FIG. 7b, the obstacles 701 are easier to discern than in the visible image of FIG. 7a. FIG. 7c is a contrast enhanced thermal image of the road 700 of FIG. 7a.

Figure 7D:
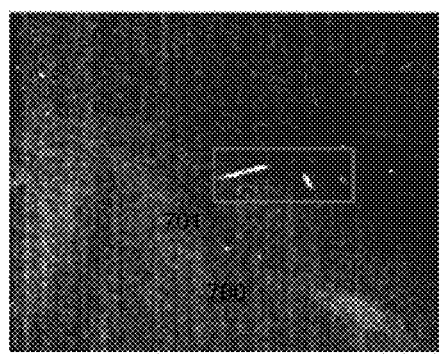
Figure 7E:
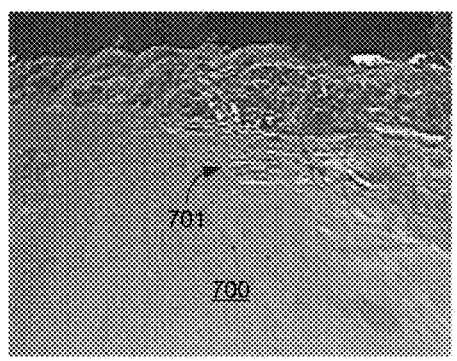
FIG. 7e is a ColorFuse image of the road of FIG. 7d.

FIG. 7d is a polarization image of the road 700 of FIG. 7a. The obstacle 701 in this image is easily discerned, though the polarization image does not provide much context to the obstacle in relation to the road 700. FIG. 7e is a ColorFuse image of the roadway of FIG. 7d. The ColorFuse image shows both thermal and polarimetric data in a single image, and provides the greatest contrast.

Figure 8A:
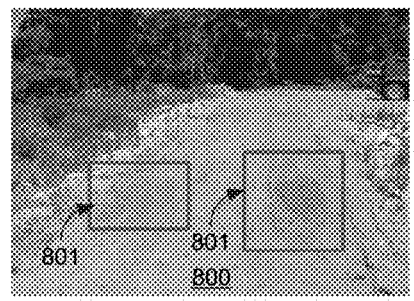
FIG. 8a is a visible image of a dirt road depicting exemplary obstacles the road at night.
Figure 8B:
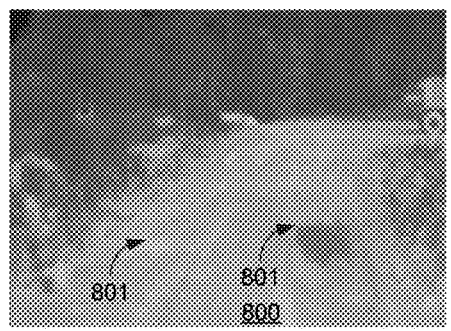
Figure 8C:
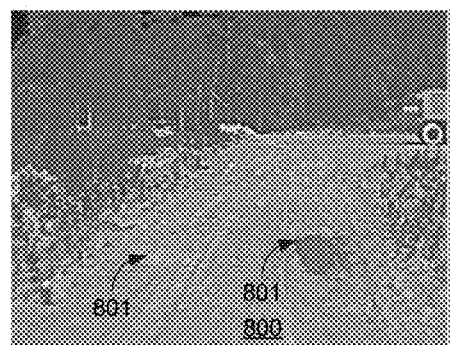

FIG. 8a is a visible image of a dirt road 800 depicting exemplary obstacles 801 on a road 800 at night. The obstacles 801 comprise wet dirt and mud in the image. These are potential hazards which might immobilize some ground vehicles. FIG. 8b is a thermal image of the road 800 of FIG. 8a. FIG. 8c is a contrast enhanced thermal image of the road 800 of FIG. 8a.

Figure 8D:
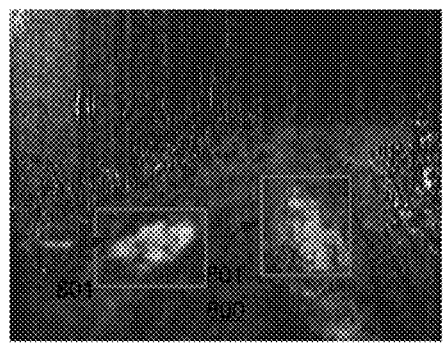
Figure 8E:
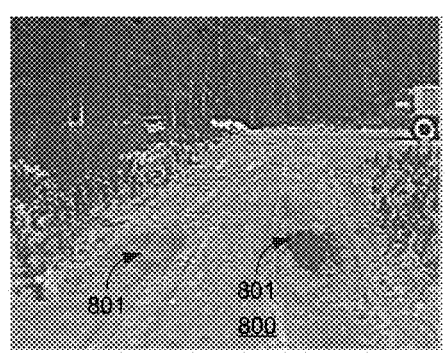
FIG. 8e is a ColorFuse image of the roadway of FIG. 8d.

FIG. 8d is a polarization image of the road 800 of FIG. 8a. The obstacles 801 in this image are easily discerned, though the polarization image does not provide much context to the obstacles in relation to the road 800. FIG. 8e is a ColorFuse image of the roadway of FIG. 8d. The ColorFuse image shows both thermal and polarimetric data in a single image, and provides the greatest contrast. The ColorFuse image of FIG. 8e shows how the combination of thermal and polarization data products can be used to provide a good representation of road surfaces.

FIG. 9a (inset photo) is a visible image of train tracks 900 depicting exemplary segmentation of the rails in a railroad environment. FIG. 9b is a thermal image, in which identification of the tracks is difficult due to different temperatures of the objects in areas adjacent to the tracks. FIG. 9c is a polarimetric image of the train tracks 900 of FIG. 9a, and show good delineation of the tracks.

Similarly, for vessels navigating a body of water that need to avoid obstacles in the water, an LWIR polarimeter can be used to enhance contrast between obstacles that break the surface of the water and the water background. This can be particularly effective since objects floating in water tend to have the same temperature as the water they're floating in and can hence be difficult to detect through the radiometric (thermal) image.

FIGS. 10a, 10c, and 10d are Stokes vector images $S_0$, $S_1$ and $S_2$, respectively, of a maritime scene showing fishermen in a boat. FIG. 10e is a DoLP image of the same scene. FIG. 10b is a ColorFuse image of the scene. The ColorFuse image shows improvement in contrast for obstacle avoidance for vessels or advantage for search and rescue.

In another embodiment according to the present disclosure, polarization is used to detect flying aircraft, including those that are at sufficiently long range that they are poorly resolved. Detecting aerial objects is useful for collision avoidance, sense and avoid, see and avoid, air traffic control, air space deconfliction, Unmanned Aerial System (UAS) or Unmanned Aerial Vehicle (UAV) detection, drone detection, UAS threat detection, counter UAS, and the like.

Visible and short-wavelength skylight in the clear atmosphere becomes partially polarized when sunlight is scattered by the molecules of gas whose size is much less than the optical wavelength and this polarization depends on the source, target, and sensor geometry. Rayleigh scattering theory predicts that the intensity of scattering is inversely proportional to the fourth power of the wavelength and the scattered radiation is 100% linearly polarized in an arc stretching across the sky at angles 90° from the sun, with a polarization vector oriented orthogonal to the scattering plane (defined by incident and scattered rays). However, in reality multiple scattering by atmospheric molecules, aerosols, clouds, and the underlying ground surface reduce the maximum degree of polarization far below 100%. As the sun appears to move through the sky, the band of maximum polarization also changes position in the sky, always remaining oriented in a plane at 90° from the sun's location. At other angles in a clear sky with dominant Rayleigh scattering, the degree of polarization (DoP) varies according to $$DoP = DoP_{max}\left(\frac{1-\cos^2\theta}{1+\cos^2\theta}\right), \tag{13}$$

where θ is the scattering angle defined by incident and scattered rays and $DoP_{max}$ is the maximum degree of polarization (which is 1 for the theoretical Rayleigh scattering case).

Skylight can also become partially polarized or can change its polarization state when reflected from smooth surfaces. For dielectric media such as glass and paint, the Fresnel reflection equations (14 and 15 below) describe the fractional reflected intensity for the polarization components in the direction parallel (Eq. 14) and perpendicular (Eq. 15) to the plane of incidence (plane containing the surface normal and the incident and reflected rays), $$R_{\|} = \left(\frac{n_t\cos\theta_i - n_i\cos\theta_t}{n_i\cos\theta_t + n_t\cos\theta_i}\right)^2 \tag{14}$$

-continued $$R_{\parallel} = \left(\frac{n_t\cos\theta_i - n_i\cos\theta_t}{n_i\cos\theta_i + n_t\cos\theta_t}\right)^2 \quad (15)$$

where $n_i$ and $n_t$ are the indices of refraction for the incident and transmitting media, respectively, and $\theta_i$ is the angle of incidence on the material and $\theta_t$ is the angle of transmission into the material.

In the polarimetric mode in one embodiment, the polarizer rotates continuously and measures the Stokes parameters S0, S1, and S2, which can be used to determine the degree of linear polarization and the angle of polarization as $$DoLP = \left(\sqrt{s_1^2 + s_2^2}\right) \div s_0 \quad (16)$$

$$AoP = \frac{1}{2}\tan^{-1}\left(\frac{s_2}{s_1}\right) \quad (17)$$

respectively, where S0 is the total intensity of the light, S1 is the difference between horizontal and vertical polarization, and S2 is the difference between linear +45° and −45° polarization. The DoLP expresses the fraction of intensity that is linearly polarized. A perfectly polarized wave has a DoLP of 1 and a randomly polarized wave has a DoLP of 0. The AoP is used to represent the angle of the major axis of the polarization ellipse with respect to the x axis [1].

In one embodiment, the polarizer rotates at a spin rate of 2700 degrees per second while taking images at 0°, 45°, 90°, and 135° in order to grab the frames needed to obtain the three Stokes parameters. In other embodiments, the spin rate may be between the range of six (6) degrees per second to 6500 degrees per second. Since the polarimeter is stationary while capturing the airplane as it moves through the polarimeter's field of view (FOV), pixel smearing occurs and it was determined that the airplane moves approximately 2.5 pixels over the four frames. The number of pixels smeared varies according to $$\text{\# of pixels smeared} = \frac{V_p \times \Delta t}{R}\left(\frac{180°}{\pi\text{rad}}\right)\left(\frac{N_{hp}}{FOV_h}\right) \quad (18)$$

where Vp is the speed of the plane, R is the range distance from the airplane to the imager, $N_{hp}$ is the number of horizontal pixels, and $FOV_h$ is the field of view of the imager in the horizontal direction. Δt was found by dividing the polarizer spin rate by the total amount the polarizer needed to be rotated in order to grab the four frames used to compute the Stokes parameters. Data from testing performed in Bozeman, Mont. was used to determine the number of pixels smeared and the values used in Equation 18 are given in Table 1 below. The speed of the airplane was found using flightaware.com, which tracks the airplane's speed throughout its flight route. The airplane-to-imager range was found using Google maps.

TABLE 1

| Parameter | Value |
|---|---|
| Speed of the Airplane ($V_p$) | ~101 m/s |
| Airplane-to-Imager Range (R) | ~8 km |
| Number of Horizontal Pixels Imaged with the Polarimeter (Nhp) | 640 pixels |
| Horizontal Field of View (HFOV) | 9.3° |
| Polarizer Spin Rate | 2700°/s |
| Total Degrees the Polarizer Rotated | 135° |
| Δt | 0.05 s |

The maximum degree of skylight polarization was modeled using an vector (polarized) radiative transfer model, which was validated in the visible spectrum with the Montana State University's all-sky polarimeter. The code was used with surface reflectance measurements and aerosol parameters from a solar radiometer operated as part of the Montana State University Aerosol Robotic Network (AERONET). The aerosol optical depth was extrapolated from 1.64 μm to 2.50 μm using Angstrom's turbidity equation to model skylight polarization in the SWIR. For aerosol parameters, the AERONET-retrieved aerosol optical depth, size distribution, and refractive index were used as inputs to the vector radiative transfer model.

Figure 11:
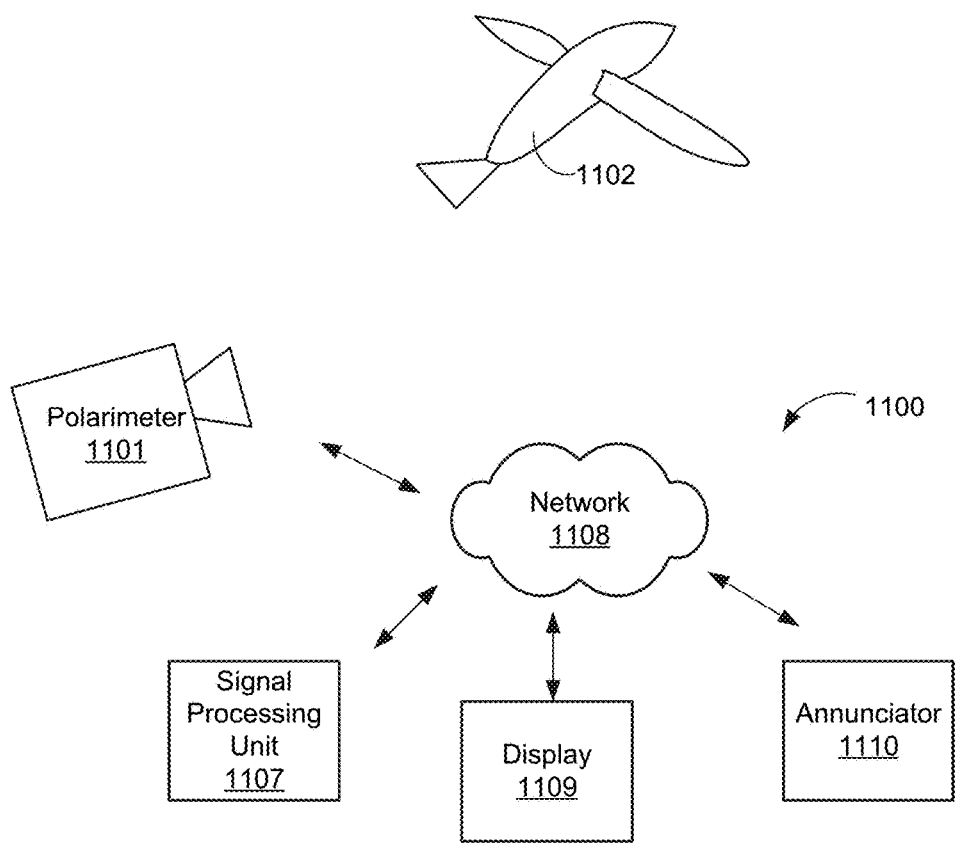
FIG. 11 illustrates a system in accordance with an exemplary embodiment of the present disclosure for detecting aerial objects.

FIG. 11 illustrates a system 1100 in accordance with an exemplary embodiment of the present disclosure for detecting aerial objects 1102. The system 1100 comprises a rotating polarimeter 1101 and a signal processing unit 1107, which collect and analyze images for detection and annunciation of an aerial object 1102. Exemplary aerial objects 1102 may be manned or unmanned (autonomous) aircraft (such as drones), or the like.

The polarimeter 1101 comprises a specialized polarizing imaging device for recording polarized images, such as a digital camera or thermal imager that collects images. In this embodiment the polarimeter 1101 is a short range infrared (SWIR) and medium range (MWIR) imaging polarimeter. Further, the polarimeter 1101 in this embodiment includes a rotating polarizer that rotates (at a spin rate of 2700 degrees per second in one embodiment) while taking images at 0°, 45°, 90°, and 135° relative to the polarimeter. Other embodiments employ a polarizer that does not rotate.

The polarimeter 1101 collects raw image data and transmits the raw image data to the signal processing unit 1107, which processes the data as further discussed herein. The processed data is then displayed to the operator on display 1109 or detection is annunciated on an annunciator 1110, as discussed herein with respect to the annunciator 110 of FIG. 1. Although FIG. 11 shows the polarimeter 1101, the signal processing unit 1107, the display 1109, and annunciator 1110 as separate items, the polarimeter 1101 and signal processing unit 1107 are packaged into one device in certain embodiments.

In the illustrated embodiment, the polarimeter 1101 sends raw image data (not shown) to the signal processing unit 1107 over a network or communication channel 1108 and processed data is sent to the display 1109 and annunciator 1110. The signal processing unit 1107 receives the raw image data, filters the data, and analyzes the data as discussed further herein to provide enhanced imagery and detections and annunciations. The network 1108 may be of any type network or networks known in the art or future-developed, such as a simple communications cable, the internet backbone, Ethernet, Wifi, WiMax, broadband over power line, coaxial cable, and the like. The network 108 may be any combination of hardware, software, or both. Further, the network 1108 could be resident in a sensor (not shown) housing both the polarimeter 1101 and the signal processing unit 1107. The signal processing unit 1107 is substantially similar to the signal processing unit 107 discussed herein with respect to FIGS. 1 and 2.

The method for detecting aerial objects is substantially similar to the method for detecting objects in a roadway as discussed herein with respect to FIG. 3.

Tests to Detect Aerial Objects:

A test was performed to detect poorly resolved airplanes (≥4 pixels on target) in flight during daytime partly cloudy and smoky conditions in Bozeman, Mont. The system 1100 measured the polarization signatures of airplanes and the surrounding skylight from 1.5 to 1.8 µm in the short-wave infrared (SWIR). An airplane flying in a clear region of partly cloudy sky was found to be 69% polarized at an elevation angle of 13° with respect to the horizon and the surrounding skylight was 4-8% polarized (maximum skylight DoLP was found to be 7-14% at an elevation angle of 51°). As the airplane increased in altitude, the DoLP for both airplane and surrounding sky pixels increased as the airplane neared the band of maximum sky polarization. It was found that the airplane can be less polarized than its surrounding skylight when there is heavy smoke present. In such a case, the airplane was 30-38% polarized at an elevation angle of 17°, while the surrounding skylight was approximately 40% polarized (maximum skylight DoLP was 40-55% at an elevation angle of 34°). In both situations the airplane was most consistently observed in DoLP images rather than S0 or AoP images.

The detection of airplanes in flight requires careful consideration of the skylight degree and angle of polarization. In this study, poorly resolved airplanes (≥4 pixels on target) were detected in flight during daytime partly cloudy and smoky conditions in Bozeman, Mont. In order to determine the approximate airplane reference angle with respect to the horizon, an image of a grid pattern was used to determine reference angles in the SWIR polarimetric images. The building's roofline in the camera images was used as the reference horizon.

Test of Observed Airplane in a Partly-Cloudy Atmosphere

Figure 12:
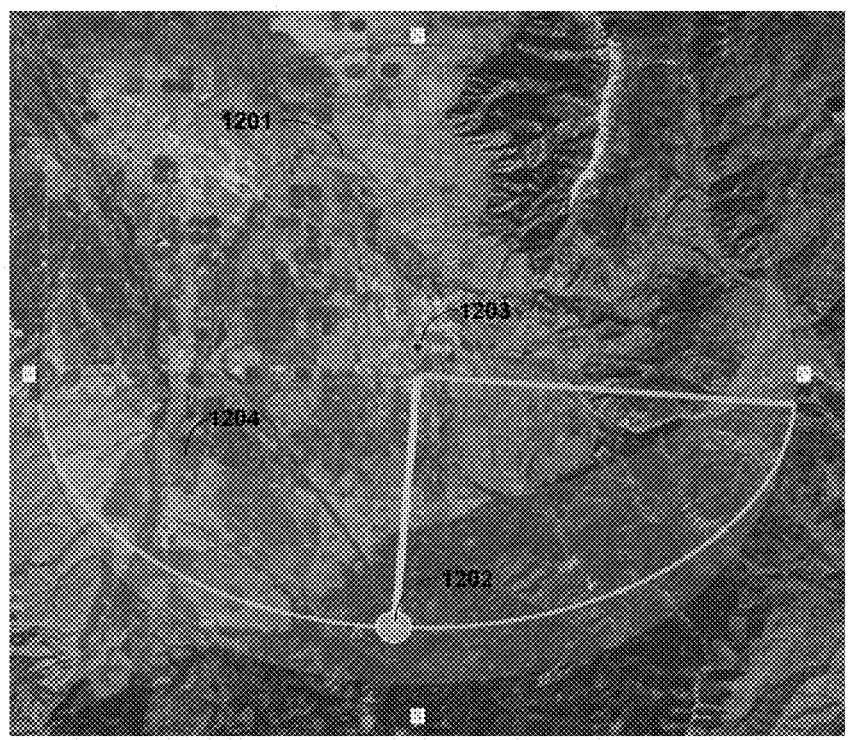
FIG. 12 is a Google map depicting the sun-airplane-sensor geometry during a test of the system of FIG. 11 to detect an airplane in cloudy conditions.

One test was performed to detect a poorly resolved airplane in a partly-cloudy sky with the SWIR-MWIR Polarimeter at 1:28 PM (MDT with UTC offset −6). FIG. 12 is a Google map depicting the sun-airplane-sensor geometry. The blue symbol 1201 represents the position of the airplane (not shown) and the yellow dot 1202 represents the position of the sun (not shown) with respect to the polarimeter (not shown) that was located at Montana State University marked by the red dot 1103. The yellow crescent-shaped area 1204 represents the sun's path throughout the day.

Figure 13:
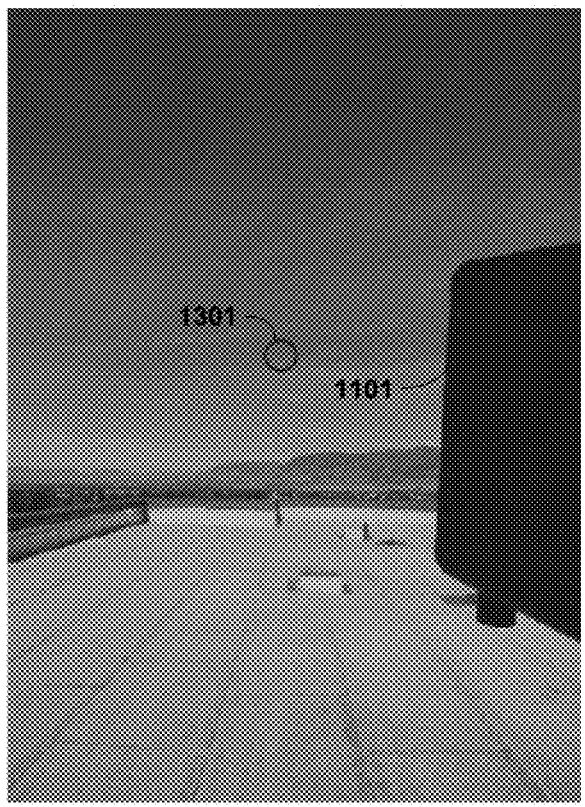
FIG. 13 depicts the position of the airplane in relation to the polarimeter in the test of FIG. 12.
Figure 14:
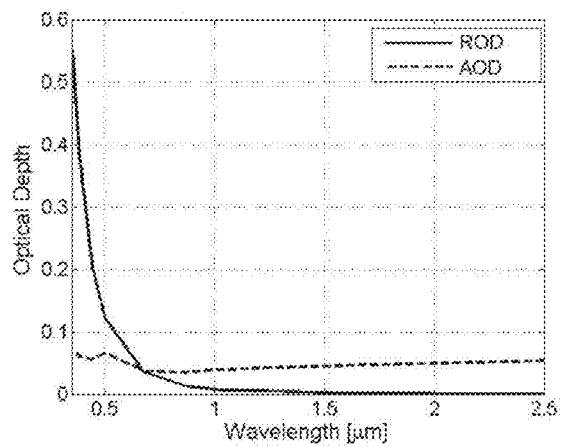
FIG. 14 depicts the Aerosol and Rayleigh optical depth spectra for the test of FIG. 12.
Figure 15:
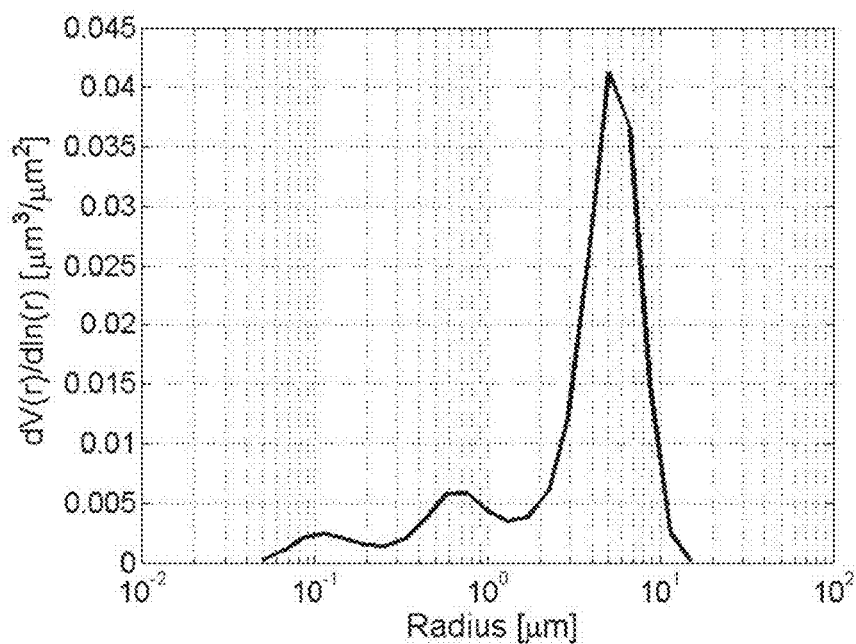
FIG. 15 depicts the AERONET-retrieved aerosol volume size distribution for the test of FIG. 12.

In this test, the sun's azimuth and elevation angles were 185° and 40°, respectively. The sun (not shown) was positioned southwest of the polarimeter 1101 and the airplane (which was not visible in photographs, but is in the area of the circle at reference number 1301 (FIG. 13)) was located north of the polarimeter 1101, as seen in FIG. 13. The airplane was approximately 13° from the horizon and was flying east. FIG. 14 depicts the Aerosol and Rayleigh optical depth spectra for the test. The aerosol optical depth was relatively low and it was higher than the Rayleigh optical depth between 1.5 and 1.8 µm. FIG. 15 depicts the AERONET-retrieved aerosol volume size distribution. The aerosol radii were between 1.0 and 10 µm, with a dominant mode centered at approximately 5 µm.

Figure 16:
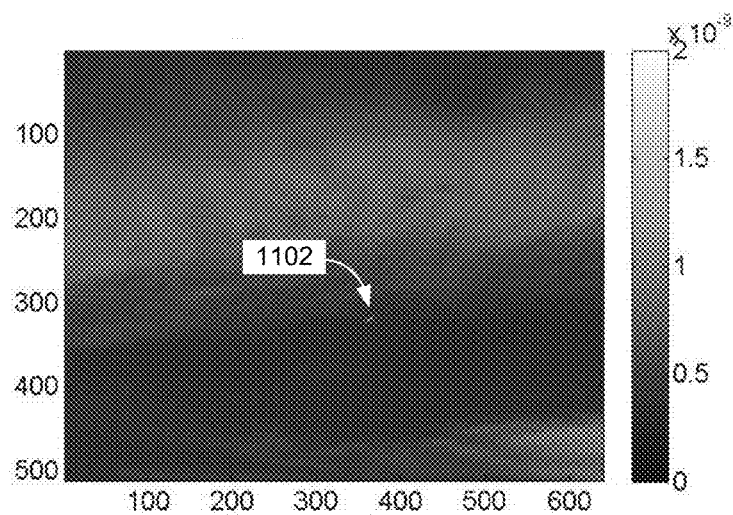
FIG. 16 depicts the S0 images for the test of FIG. 12.
Figure 17:
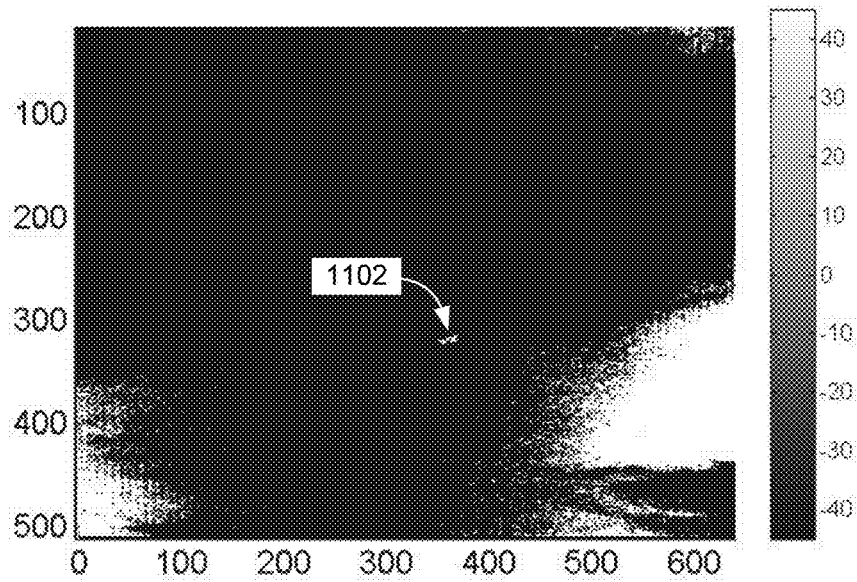
FIG. 17 depicts the AoP images for the test of FIG. 12.

The test results showed that the airplane 1102 was detected in both the DoLP and AoP images. FIG. 16 depicts the S0 and FIG. 17 depicts the AoP images. The AoP image of FIG. 17 indicates the dark areas are likely thin clouds 1701 throughout the otherwise clear-appearing portions of the S0 image of FIG. 16. Select clouds, normally liquid clouds, display AoP oriented 90° from clear-sky AoP. For these clouds, scattered light oriented parallel to the scattering plane dominates the perpendicularly polarized Rayleigh-scattered light between the instrument and the cloud. The AoP image in FIG. 17 suggests that liquid clouds were behind the airplane (even though they are not obvious in the S0 image) and they scattered light parallel to the scattering plane, thus causing the AoP signatures to rotate 90° from the clear sky AoP. Conversely, the white regions of the AoP image indicate areas where the skylight dominates the cloud-scattered light.

Figure 18:
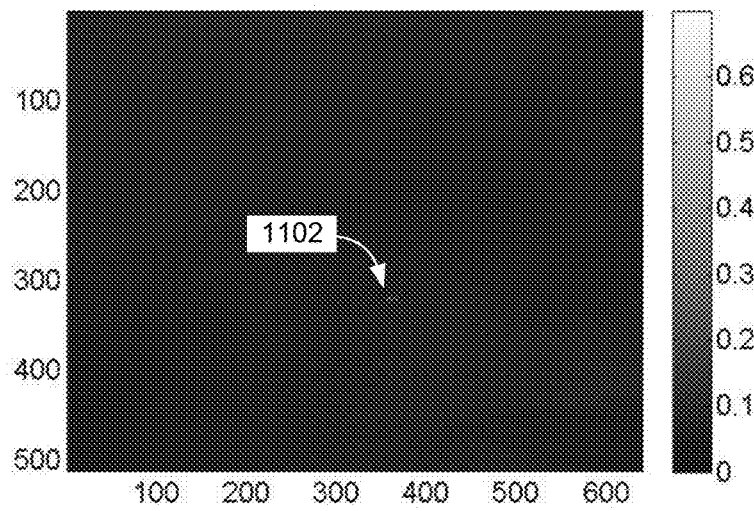
FIG. 18 depicts the DoLP images for the test of FIG. 12.
Figure 19:
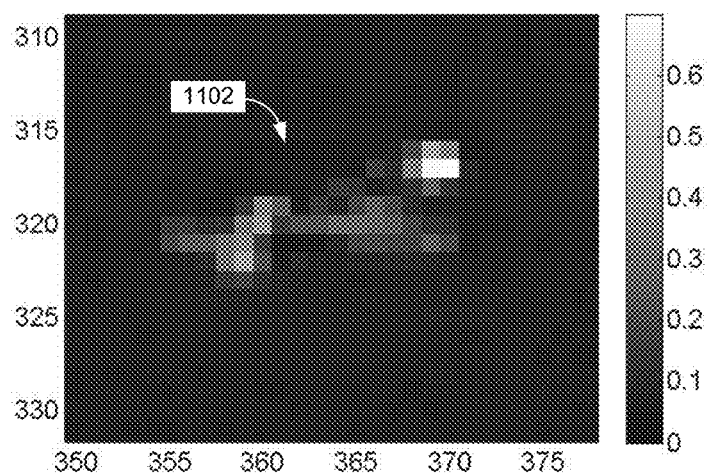
FIG. 19 depicts a zoomed-in photograph of the airplane in the DoLP image of FIG. 18.
Figure 20:
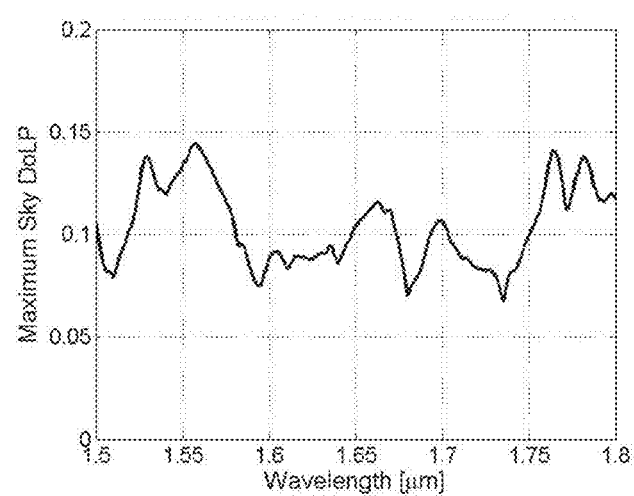
FIG. 20 depicts the modeled maximum DoLP spectrum for the test of FIG. 12.

FIG. 18 depicts the DoLP image showing the airplane 1102, and FIG. 19 depicts a zoomed-in photograph of the airplane 1102 of FIG. 18. The airplane 1102 was observed to be between cloud layers at 13° above the horizon and the maximum polarization of the airplane was found to be 69%. The strong polarization at the nose of the airplane is likely an artifact resulting from the airplane motion. The body of the airplane shows polarization ranging from 20% to 60% that is not likely to suffer from this artifact since that part of the airplane subtends two or more pixels. The surrounding skylight was found to be between 4-8% at angles of 11.7° to 17.6° with respect to the horizon. As the airplane approached the band of maximum polarization (50° from the horizon), the surrounding skylight DoLP also increased, as expected. A vector radiative transfer model was used to simulate the maximum skylight DoLP spectrum, which varied between 7% and 15% for wavelengths between 1.5 and 1.8 µm at 50° above the horizon. FIG. 20 depicts the modeled maximum DoLP spectrum.

Test of Observed Airplane in a Heavily-smoky Atmosphere

Figure 21:
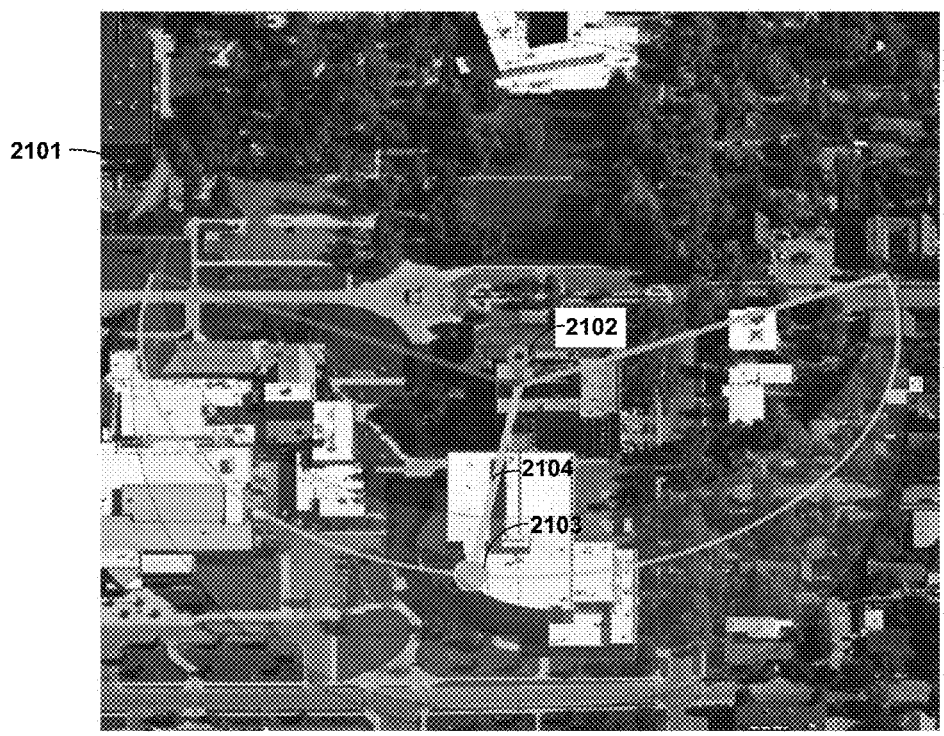
FIG. 21 is a Google Maps image showing the sun-airplane-sensor geometry in a test to detect an airplane in smoky conditions.

A test was performed of a distant airplane in a sky containing thick wildfire smoke (at 1:57 PM MDT with UTC offset −6). FIG. 21 is a Google Maps image showing the sun-airplane-sensor geometry. The blue symbol 2101 represents the position of the airplane (not shown) and the yellow dot 2103 represents the sun (not shown) with respect to the polarimeter location at Montana State University, represented by the red dot 2102.

The sun was at an azimuth angle of 193° and an elevation angle of 56° (yellow line 2104) and the airplane was slightly northwest of the polarimeter (red dot 2102), flying southward at an elevation angle of 16.9°. The polarimeter was located on the roof of Cobleigh Hall on the Montana State University campus.

Figure 22:
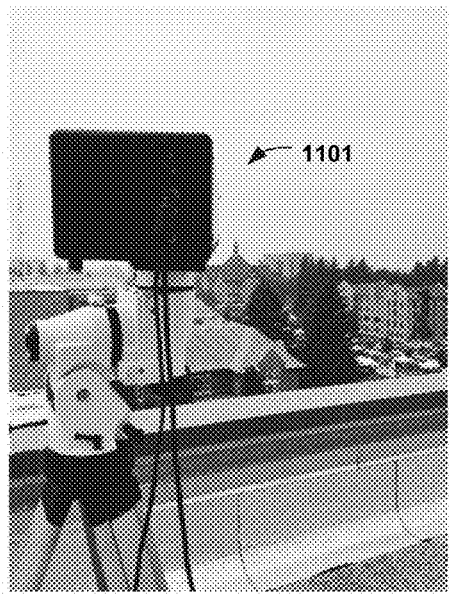
FIG. 22 is a photograph of the polarimeter pointing at the airplane hidden within the smoke layer in the test of FIG. 21.
Figure 23:
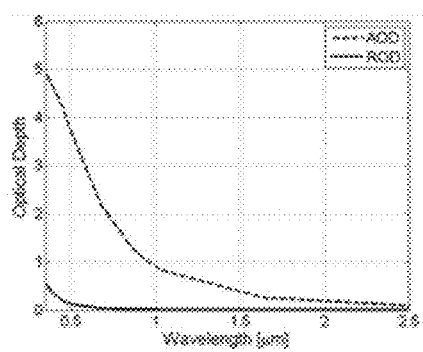
FIG. 23 depicts the aerosol and Rayleigh optical depth spectra of the test of FIG. 21.
Figure 24:
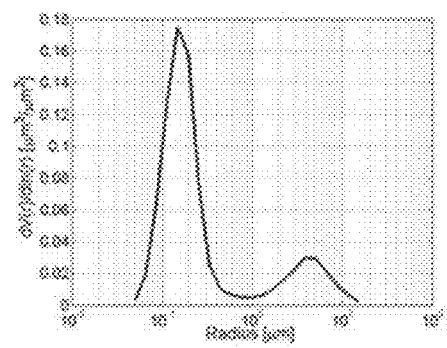
FIG. 24 depicts the AERONET-Retrieved aerosol volume size distribution of the test of FIG. 21.

FIG. 22 is a photograph of the polarimeter 1101 pointing at the airplane (not shown) hidden within the smoke layer. The aerosol and Rayleigh optical depth spectra, along with the AERONET-Retrieved aerosol volume size distribution, are given in FIGS. 23 and 24, respectively. The aerosol optical depth was greater than the Rayleigh optical depth from 1.5 to 1.8 µm and the radii of the aerosol particles were between 0.1 and 1 µm. The aerosol optical depth was high from wildfire smoke present in the Gallatin Valley and the aerosol optical depth stayed higher than the Rayleigh optical depth over the entire optical spectrum.

Figure 25:
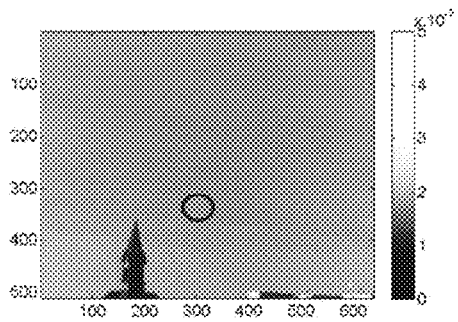
FIG. 25 depicts the S0 images for the test of FIG. 21.
Figure 26:
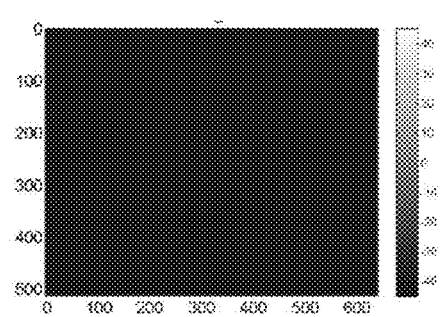
FIG. 26 depicts the AoP images for the test of FIG. 21.
Figure 27:
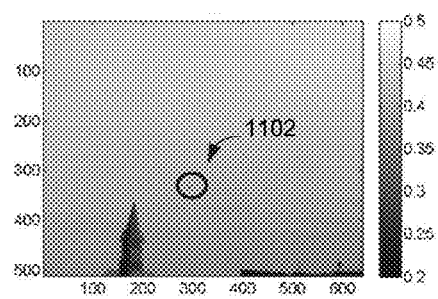
FIG. 27 depicts the DoLP images for the test of FIG. 21.
Figure 28:
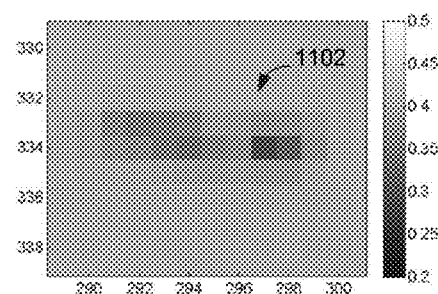
FIG. 28 depicts a zoomed-in photograph of the airplane in the DoLP image of FIG. 21.

In this test, the airplane was detectable in the DoLP image, but not in the AoP image. The S0 and AoP images are shown in FIGS. 25 and 26, respectively. (The circle 2501 in FIG. 25 represents the location of the airplane, though it cannot be seen.) FIG. 27 is the DoLP image showing the airplane 1101. FIG. 28 is a zoomed-in image of the airplane 1101 of FIG. 27. The airplane was 16.9° above the horizon and the maximum polarization of the airplane was 38%. The tip of the airplane was more polarized than the tail and the entire airplane was slightly less polarized than the surrounding skylight, which was found to be 40%. As the airplane approached the band of maximum polarization (34° from the horizon), the surrounding skylight DoLP also increased, as expected. The SOS model predicted the maximum skylight DoLP in the 1.5-1.8 µm band to vary in the range of 40-55% at an elevation angle of 34°.

Figure 29:
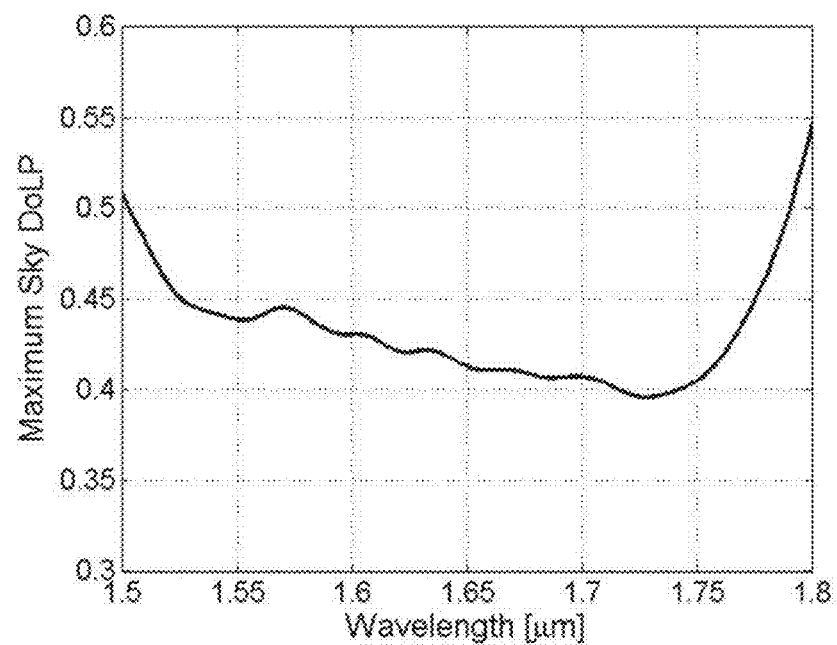
FIG. 29 depicts the modeled maximum DoLP for the test of FIG. 21.

FIG. 29 depicts the modeled maximum DoLP. Note that this case illustrates an interesting situation where surprisingly high skylight DoLP is observed despite a very high aerosol optical depth. High SWIR skylight polarization has been observed in the presence of high aerosol optical depth when the aerosol particles are small.

Hobby Airplane Detection Test

A test was performed to collect polarimetric video of a hobby airplane in flight. The video data included the airplane against both sky and mountain backgrounds. The sky was clear with the ambient temperature ranging between 40° F. and 50° F. during the test. The background sky temperature was lower than –40° F. which was the minimum scale of Fluke 62 Infrared Thermometer used for the measurement. The sky temperature measurement was taken at the azimuth and elevation of the airspace utilized by model aircraft.

Figure 30:
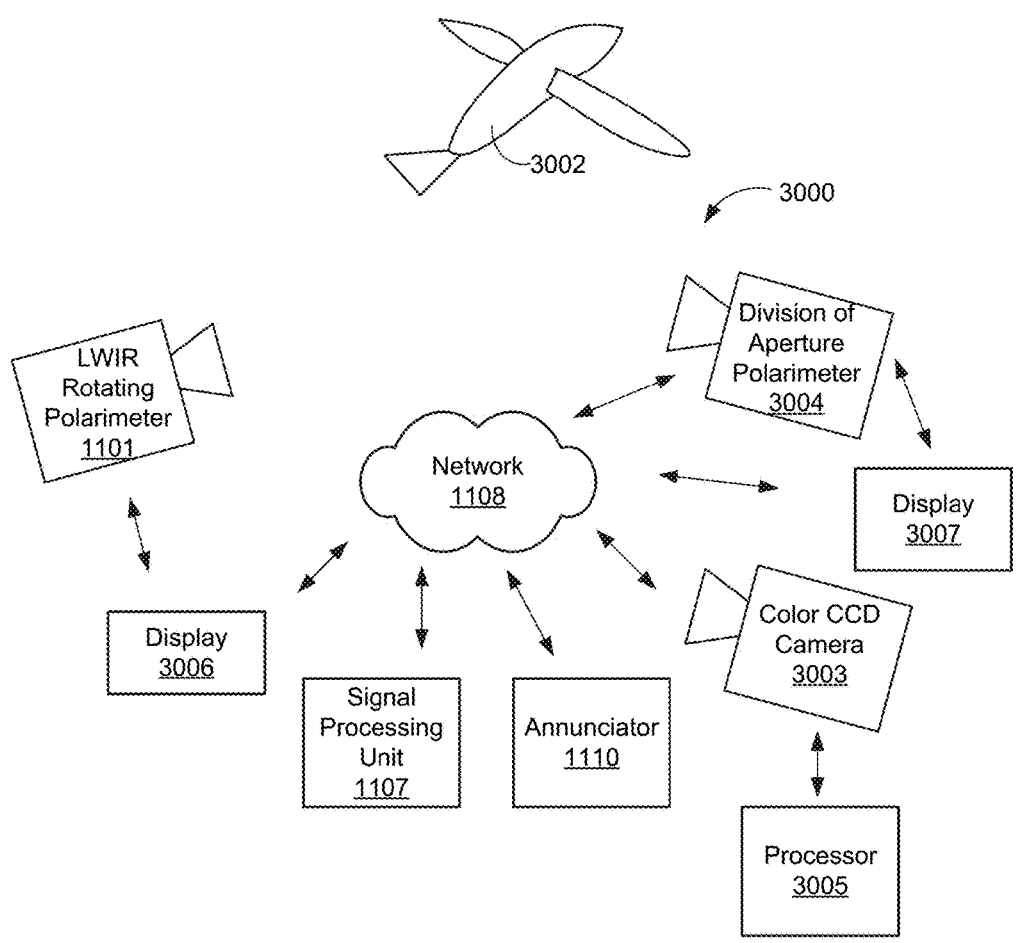
FIG. 30 depicts a system used in the test to detect a hobby aircraft.

FIG. 30 depicts a system 3000 used in the test of the hobby aircraft 3002. Three cameras were used in this test: a long-wave infrared (LWIR) Rotating Polarizer Polarimeter 1101, a color CCD camera 3003, and a division of aperture polarimeter 3004. The LWIR polarimeter 1101 comprises a rotating polarizer that takes sequential imagery with the polarizer orientation varying between video frames. The polarimeter 3004 is a visible polarimeter employing a division of aperture approach in which each sub aperture collects a different orientation of polarization. The color CCD camera 3003 tracks the airplane during flight using conventional video photography.

The polarimeters 1101 and 3004 and camera 3003 were co-mounted next two one another on a pan/tilt unit (not shown) on tripod for the test. The polarimeters 1101 and 3004, camera 3003, pan/tilt unit (PTU), tripod, and all associated computers and control hardware were mounted in a truck to facilitate quick relocation between flight runs. The video feed from the color CCD was connected to a dedicated processor 3005 that processed the video data and provided tracking inputs to the PTU based on the output of several algorithms. As an alternative to automatic tracking, the user can take control of the PTU at any time should the computer lose track. This occurred several times during the test. The PTU operator stood behind the truck in order to view the PTU, color video CCD output, and the airplane.

Polarimeter operators, one for each polarimeter, sat inside the truck where two displays 3006 and 3007 were located; one each dedicated to the polarimeters 1101 and 3004, respectively. The sensor operators controlled the various sensor parameters such as gain, integration time, frame rate, etc., as well as the video data collection from each sensor.

At certain points during the field test, it was found that the contrast between the airplane and the background (specifically the sky) was insufficient to maintain target lock. Under these conditions, the operator would have to take over the tracking process.

Figure 31A:
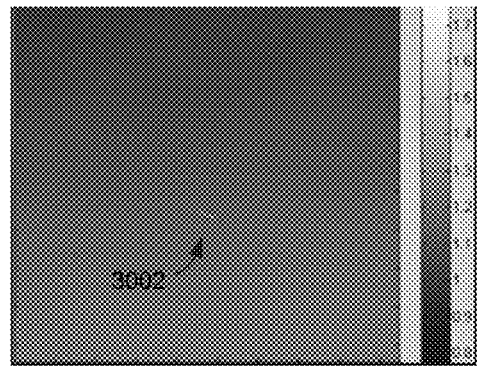
FIG. 31a depicts the S0 polarization imagery collected of a low contrast target in a test of the system of FIG. 30.
Figure 31B:
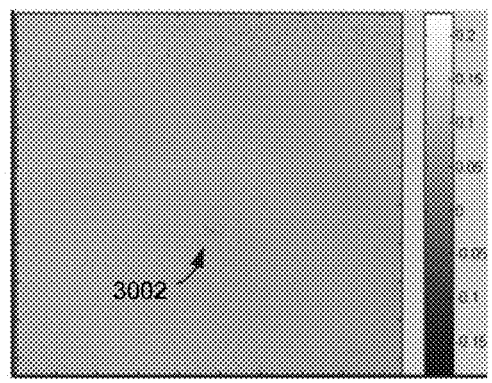
FIG. 31b depicts the S1 polarization imagery collected of a low contrast target in a test of the system of FIG. 30.
Figure 31C:
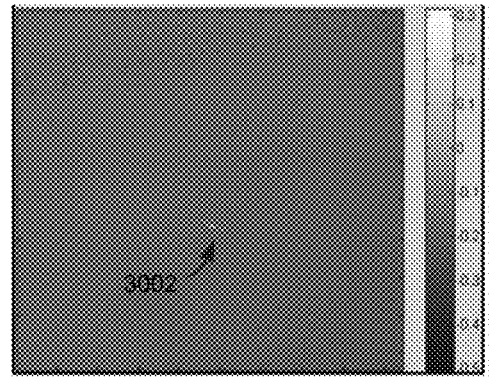
FIG. 31c depicts the S2 polarization imagery collected of a low contrast target in a test of the system of FIG. 30.

FIG. 31a-31c depict the calibrated polarization imagery (S0, S1, and S2, respectively) collected by the polarimeter 3004 when the color camera 3003 encountered low target contrast. FIG. 32 depicts the imagery from the color camera 3003, and FIG. 33 is a zoomed-in view of the image of FIG. 32. FIG. 34 is a data fusion of the three images in FIG. 31a-31c. Note the significant improvement in target (airplane) background contrast in the data fusion image of FIG. 34 over the standard color image of FIGS. 32 and 33.

Additionally, it was observed the target could switch between positive and negative contrast in quick succession. Furthermore, portions of the target could have negative contrast, while the remained presented positive contrast. Here, positive contrast is defined as a bright target against a darker background, and negative contrast is a dark target against a brighter background. These are difficult scenarios for many tracking algorithms, and accounting for switching from positive to negative adds to the computational burden of the tracking hardware. The data fusion algorithm seeks to overcome this problem by not only enhancing contrast between the target and the background, but also by presenting only positive contrast imagery to the tracker hardware.

Figures 35, 37:
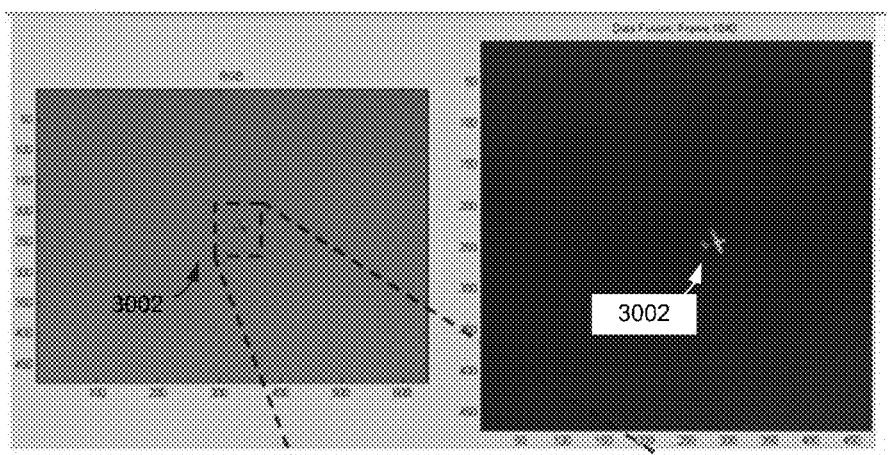
FIG. 35 depicts an example of the target (airplane) having both positive (fuselage) and negative background contrast (wings) when observed by the color camera.
FIG. 37 is a data fusion image of the S0-S2 images (not shown) for this test
Figure 36:
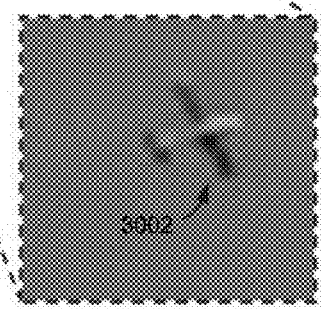
FIG. 36 is a zoomed-in view of the image of FIG. 35.

FIG. 35 depicts a color image of the target (airplane) having both positive (fuselage) and negative background contrast (wings) when observed by the color camera. A standard tracking algorithm would therefore select either the fuselage or the wings, but not both. In either case, the tracking algorithm would not be able to utilize all the pixels subtended by the target. FIG. 36 is a zoomed-in view of the image of FIG. 35.

FIG. 37 is a data fusion image of the S0-S2 images (not shown) for this test. Note that the data fusion image provides much starker contrast than the color image. The data fusion algorithm presents positive contrast for the entire target. Utilizing this approach, a standard tracking algorithms would only have to account for positive contrast and would have a greater number of pixels to track; increasing probability of maintaining target lock.

These examples represent several possible embodiments of the invention but other embodiments are possible. Polarimeters can take a number of forms in terms of their operation including rotating element, division of aperture, division of focal plane (pixelated polarization filters), and channeled polarimeters, to name a few. Polarization based aerial detection is possible through any of these approaches. Likewise, polarization based detection is possible throughout the optical spectrum to include the LWIR, MWIR, SWIR and visible portions of the spectrum. The examples given here are not exclusive.

Further, although the exemplary tests disclosed herein to detect aerial vehicles had the polarimeters located on the ground, in other embodiments the polarimeters are themselves located in aerial vehicles, and are detecting other aerial vehicles.

What is claimed is:

1. A method of detecting an aerial object, the method comprising:
   recording raw image data of an area using a polarimeter to obtain polarized images of the area;
   calculating Stokes parameters $S_0$, $S_1$, and $S_2$ from the polarized images to create Stokes images by weighted subtraction of the polarized images;
   computing Degree of Linear Polarization (DoLP) images and orientation images from the Stokes images;
   creating multi-dimensional imagery using one or more of: the polarized images, the Stokes parameters, the DoLP images and the orientation images;
   applying contrast enhancement algorithms to the multi-dimensional imagery to form enhanced object images;
   automatically detecting the aerial object from the enhanced object images.

2. The method of claim 1 where the polarimeter is a division of focal plane polarimeter.

3. The method of claim 1 where the polarimeter is a rotating polarimeter.

4. The method of claim 3, wherein the step of recording raw image data of an area using a polarimeter to obtain polarized images of the area comprises rotating the polarizer at a spin rate while taking images at 0°, 45°, 90°, and 135°.

5. The method of claim 4 where the spin rate is within the range of 6 degrees per second to 6500 degrees per second.

6. The method of claim 1, further comprising automatically tracking the aerial object.

7. The method of claim 1, further comprising displaying the enhanced object images to a user.

8. The method of claim 1, further comprising annunciating detected objects to a user.

9. The method of claim 1, further comprising performing corrections on the polarized images correcting the polarized images for non-uniformity.

10. The method of claim 9, wherein the step of performing corrections on the polarized images further comprises performing optical distortion and registration corrections.

11. The method of claim 1, wherein the area comprises the sky.

12. The method of claim 1, wherein the step of recording raw image data of an area using a polarimeter to obtain polarized images of the area is performed from an aerial vehicle.

13. A method for detecting the presence of aerial objects, the method comprising:
   recording raw image data of an area with a polarimeter to obtain polarized images of the area;
   performing corrections on the polarized images to form corrected images;
   computing non-polarized intensity and polarization data products from the corrected images;
   converting the intensity and polarization data products to a multi-dimensional data set to form multi-dimensional imagery;
   applying contrast enhancement algorithms to multi-dimensional imagery to form enhanced object images;
   recording in memory the location of objects detected from the enhanced object images;
   classifying detected objects based upon one or more of: their temporal, spatial, infrared (IR), intensity, or polarimetric signatures, wherein multiple objects may be independently classified into separate groups or subgroups based upon one or more of: their temporal, spatial, IR, intensity, or polarimetric signatures.

14. The method of claim 13, wherein the step of recording raw image data of the area using a polarimeter is not dependent upon the brightness of available light.

15. A system for detecting an aerial object, the system comprising:
   a polarimeter configured to record raw image data of an area to obtain polarized images of the area;
   a signal processing unit configured to calculate Stokes parameters $S_0$, $S_1$, and $S_2$ from the polarized images to create Stokes images by weighted subtraction of the polarized images, the signal processing unit further configured to compute Degree of Linear Polarization (DoLP) images and orientation images from the Stokes images, the signal processing unit further configured to create multi-dimensional imagery using one or more of: the polarized images, the Stokes parameters, the DoLP images and the orientation images, the signal processing unit further configured to apply contrast enhancement algorithms to the multi-dimensional imagery to form enhanced object images, the signal processing unit further configured to automatically detect the aerial object from the enhanced object images.

16. The system of claim 15 where the polarimeter is a division of focal plane polarimeter.

17. The system of claim 15 where the polarimeter is a rotating polarimeter.

18. The system of claim 17, where the polarimeter rotates at a spin rate while taking images at 0°, 45°, 90°, and 135°.

19. The system of claim 18 where the spin rate is within the range of 6 degrees per second to 6500 degrees per second.

20. The system of claim 19, where the spin rate is substantially 2700 degrees per second.

* * * * *